US012608832B2

(12) United States Patent
Kempf et al.

(10) Patent No.: US 12,608,832 B2
(45) Date of Patent: Apr. 21, 2026

(54) METHODS AND APPARATUS TO GENERATE THREE DIMENSIONAL (3D) POINT CLOUDS BASED ON SPATIOTEMPORAL LIGHT PATTERNS

(71) Applicant: Texas Instruments Incorporated, Dallas, TX (US)

(72) Inventors: Jeffrey Kempf, Dallas, TX (US); Kevin Tomei, Dallas, TX (US); Tyler Bower, Denver, CO (US); Eric Pruett, Denton, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 269 days.

(21) Appl. No.: 17/950,705

(22) Filed: Sep. 22, 2022

(65) Prior Publication Data

US 2023/0342958 A1     Oct. 26, 2023

Related U.S. Application Data

(60) Provisional application No. 63/333,912, filed on Apr. 22, 2022.

(51) Int. Cl.
 *G06T 7/521* (2017.01)
 *G06T 7/55* (2017.01)
(52) U.S. Cl.
 CPC .............. *G06T 7/521* (2017.01); *G06T 7/55* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 2009/0015791 A1* | 1/2009 | Chang | G03B 21/005 |
| | | | 353/6 |
| 2019/0180459 A1* | 6/2019 | Shi | H04N 13/271 |
| 2019/0184570 A1* | 6/2019 | Yung | B25J 9/163 |
| 2020/0082496 A1* | 3/2020 | Chong | H04N 9/3147 |
| 2022/0385042 A1* | 12/2022 | Devlin | G02B 19/0057 |

* cited by examiner

*Primary Examiner* — Xiaolan Xu
(74) *Attorney, Agent, or Firm* — Michael T. Gabrik; Frank D. Cimino

(57) ABSTRACT

Methods, apparatus, systems, and articles of manufacture to generate 3D point clouds based on spatiotemporal light patterns are disclosed. A controller includes processor circuitry to execute the instructions to generate a series of light patterns based on a set of light pattern tiles. Each of the light pattern tiles is defined by a different arrangement of illuminated pixels. Each of the light patterns is defined by a different arrangement of the light pattern tiles. The processor circuitry is to instruct a projector to project the series of light patterns; instruct an image sensor to capture a series of images of reflections of the series of light patterns; and generate a three-dimensional point cloud based on the series of captured images.

15 Claims, 17 Drawing Sheets

106

700

704

C8430 ASIC

706

RSC

710

FMT

714

FRC

FSL

PAT REQ

PAT LUT

712

PPG

DMD

702

BITPLANE #

716

SEQ

708

UMC

718

1200

METHODS AND APPARATUS TO GENERATE THREE DIMENSIONAL (3D) POINT CLOUDS BASED ON SPATIOTEMPORAL LIGHT PATTERNS

RELATED APPLICATION

This patent claims the benefit of U.S. Provisional Patent Application No. 63/333,912, which was filed on Apr. 22, 2022. U.S. Provisional Patent Application No. 63/333,912 is hereby incorporated herein by reference in its entirety. Priority to U.S. Provisional Patent Application No. 63/333, 912 is hereby claimed.

FIELD OF THE DISCLOSURE

This disclosure relates generally to three-dimensional (3D) scanning and, more particularly, to methods and apparatus to generate 3D point clouds based on spatiotemporal light patterns.

BACKGROUND

It is possible to generate 3D models, or point clouds, of real-world objects and/or scenes through 3D scanning processes. Some 3D scanning processes involve the analysis of one or more images of the object and/or scene captured while a known pattern of light is being projected onto the object and/or scene. Based on changes in the pattern as it appears in the captured image relative to the known pattern of the light being projected onto the object and/or scene, the depth of different portions of the object and/or scene can be determined. More particularly, a 3D point cloud representative of the object and/or or scene can be generated with each point in the point cloud defined by the calculated depth for each point or pixel of the projected light pattern.

Figure 1:
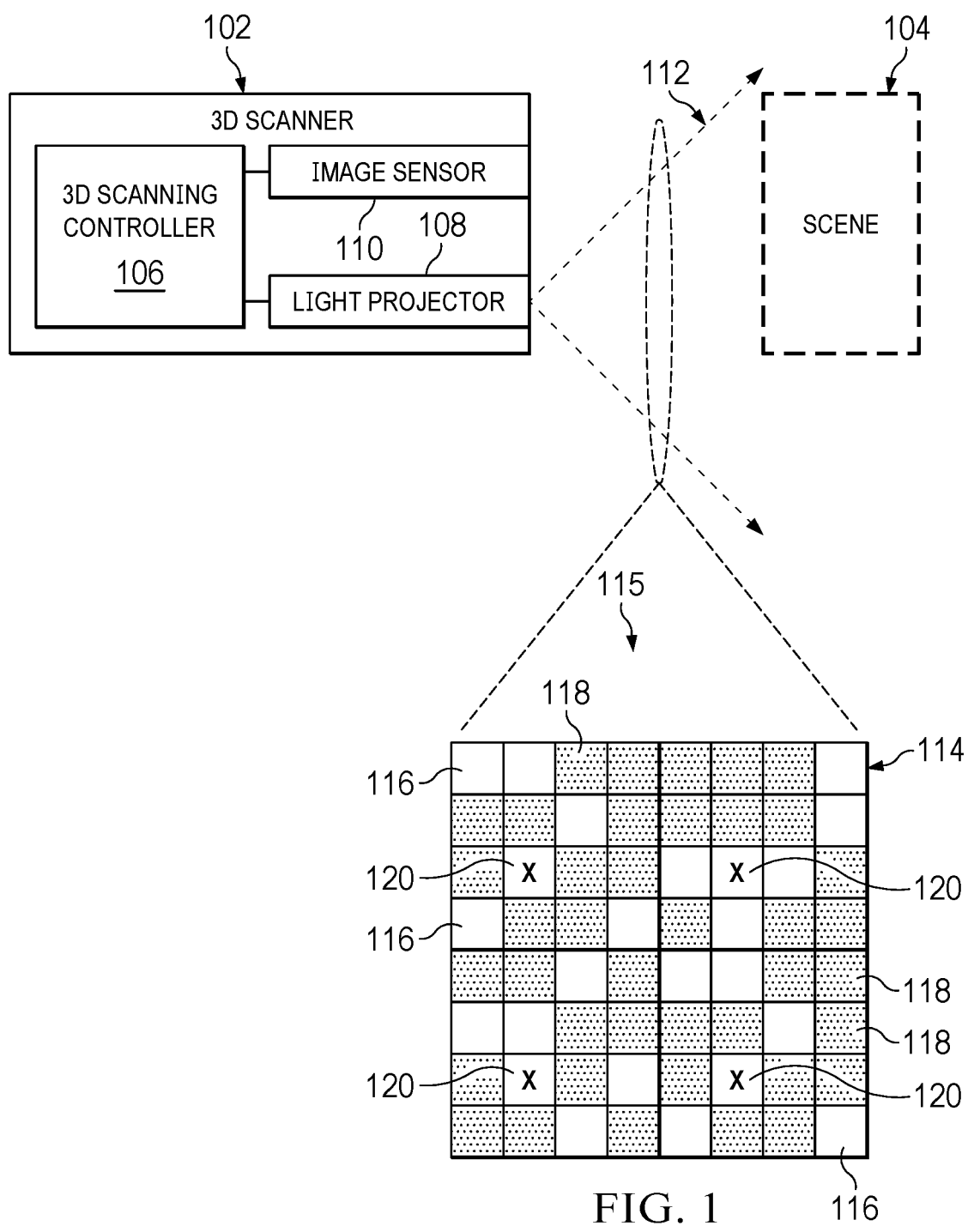
FIG. 1 illustrates an example 3D scanner constructed in accordance with teachings disclosed herein.

In general, the same reference numbers will be used throughout the drawing(s) and accompanying written description to refer to the same or like parts. The figures are not necessarily to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), crosspoint units (XPUs), or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As noted above, known 3D scanning techniques involve the capture and analysis of an image of a real-world scene onto which a known light pattern has been projected such that the captured image includes a reflection of the light pattern. The spatial correspondence (e.g., depth) of points in the real-world scene can be determined based on the known position of pixels within the known light pattern that are projected onto the corresponding points in the real-world scene. However, to enable individual pixels of the light pattern to be distinguished from one another and properly identified within the captured image, it is necessary for the pixels in the light pattern to be distributed relatively sparsely. As a result, the resolution of a 3D point cloud resulting from the above process is relatively low and limited to the density or sparsity of the pixels distributed to create the projected light pattern.

It is possible to increase the resolution of point clouds generated by 3D scanning using time multiplexed light patterns. That is, different light patterns can be projected at different points in time onto a scene and separate images can be captured of reflections of the light patterns projected on the scene at each point in time. While each light pattern may be defined by sparsely distributed pixels, the coverage of the scene by the multiple different light patterns in the aggregate can be much higher. In some examples, the different light patterns are defined so that the different arrangements of pixels across the different light patterns collectively combine to cover the full pixel array of the full frame of the projector emitting the light patterns. Thus, integrating the analysis of the different images captured at different points of time (in associated with different spatiotemporal light patterns) a relatively high resolution 3D point cloud can be generated with a 1-to-1 mapping between projector pixels and the point cloud.

While time multiplexing light patterns can facilitate the generation of higher resolution point clouds, such techniques present several challenges. In particular, the need to project multiple different light patterns onto a scene results in increased memory requirements to store each of the light patterns relative to the single image technique described above that only requires a single light pattern. Furthermore, time-multiplexing 3D scanning techniques are limited to scenes that remain stationary relative to the light projector projecting the light pattern and the image sensor capturing the images of the scene. That is, if the scene includes movement (e.g., a person walking, a bird flying, a flag flapping in the wind, etc.) and/or the projector and/or image sensor are moving relative to the scene (e.g., due to camera shake of a handheld device), the separately captured images (and the reflections of the different light patterns captured therein) cannot be combined in a reliable matter. Therefore, the resulting point cloud is corrupted and does not accurately represent the scene being scanned.

Examples disclosed herein use time multiplexed light patterns (also referred to herein as spatiotemporal light patterns) to enable the generation of 3D points clouds that can achieve higher resolution than single shot 3D scanning techniques while also enabling the generation of 3D point clouds for scenes that include motion in a memory efficient manner. More particularly, in examples disclosed herein, multiple different light patterns projected onto a screen at different points in time are generated from a relatively small set of light pattern tiles. The example light pattern tiles are significantly smaller than a full light pattern used to project onto the scene of interest and, therefore, require significantly less memory to store than a full light pattern. Furthermore, the set of light pattern tiles can be combined in different ways to generate different complete light patterns. Thus, there are no additional memory requirements to generate multiple different light patterns beyond the memory needed to store the single set of light pattern tiles used to generate the first light pattern.

In some examples, each of the light pattern tiles is defined with a relatively sparse distribution of pixels. Further, in some examples, a majority of the pixels across different ones of the light pattern tiles have mutually exclusive positions such that there is relatively little overlap in the pixels associated with any given pair of the light patterns. However, in some examples, some or all of the tiles include at least one pixel (referred to herein as a reference pixel) at the same position across the different light pattern tiles. Further, inasmuch as full light patterns are generated based on an array of multiple individual light pattern tiles, the reference pixel(s) in each tile result in an array of reference points in a full light pattern that can be used as multiple points of reference for comparing different spatiotemporal light patterns.

In some examples, the points of reference (e.g., reference pixels) within different light patterns are used to calculate solutions to the six degrees of freedom problem across different images captured in connection with the different light patterns. A solution to the six degrees of freedom problem defines the spatial relationship of the 3D scanner used to capture different ones of images corresponding to reflections of different ones of the time-multiplexed projections of the light patterns. If both the 3D scanner and the scene are stationary, the solution should be calculated with little to no margin of error. However, if the image sensor moves relative to the scene because the image sensor moves (e.g., due to camera shake), there is movement in the scene, or some combination of both, an exact solution to the six degrees of freedom will not be possible to calculate. Accordingly, in some examples, the margin or level of error in the calculated solution is compared to an error threshold to determine whether motion is present. If the error satisfies (e.g., is equal to or less than) the error threshold, disclosed examples determine there is no motion present. In such situations, disclosed examples generate a relatively high resolution 3D point cloud based on the time multiplexing technique described above by integrating the series of images associated with the series of time multiplexed light patterns projected onto the scene.

If the margin of error in the calculation of the six degrees of freedom problem does not satisfy (e.g., exceeds) the error threshold, examples determine that motion is present. However, if the motion is due to movement of a part of the scene, it is possible that other portions of the scene remain stationary. Accordingly, in some examples, a motion adaptive process is implemented to distinguish areas of the scene associated with motion and areas of the scene that are stationary. Some disclosed examples generate a relatively high resolution portions of the 3D point cloud (sometimes referred to herein as localized point clouds) for the areas of the scene that are stationary by integrating the corresponding regions in the series of captured images corresponding to the stationary areas of the scene. However, for the non-stationary areas (e.g., the areas associated with motion), only one image in the series of captured images (e.g., the last captured image) is used to generate corresponding portions of the 3D point cloud (e.g., localized point clouds). Inasmuch as the localized point clouds are based on a single captured image for the areas of motion, the resolution of the localized point cloud will have a relatively low resolution. However, these relatively low resolution portions of a full 3D point cloud can be combined with higher resolution portions (e.g., other localized point clouds) generated for the stationary areas in the scene, thereby resulting in an overall 3D point cloud with higher resolution than is possible using other known 3D scanning techniques.

FIG. 1 illustrates an example 3D scanner 102 constructed in accordance with teachings disclosed herein to scan and generate a 3D point cloud of a real-world scene 104. In some examples, the 3D scanner 102 generates a 3D point cloud of one or more particular objects in the scene 104. In this example, the 3D scanner 102 includes a 3D scanning controller 106 to interface with and control a projector 108 and an image sensor 110. As represented in the illustrated example, the projector 108 projects light 112 onto the scene. In some example, the light 112 is infrared light. In other examples, different wavelengths of light may be used (e.g., visible light) in addition to or instead of infrared light. In some examples, the projector 108 is able to emit both visible light and infrared light. In some such examples, the visible light is used to project visual content to be viewed by a user (distinct from the light pattern 114) while the infrared light is projected for purposes of 3D scanning as disclosed herein. More particularly, in some examples, the projection of the visible light is temporally separated from the projection of the infrared light as the projector iterates through successive frames of content to be displayed to a user (e.g., via the visible light). The temporal separation of the visible and infrared light can be implemented when the projector 108 is a projector that projects different colors of light (red-greenblue (RGB)) for each frame of visual content in a series of bit planes by reflecting the light using a digital micromirror device (DMD). As used herein, a bit plane is a set of bits that define the intensity of light to be projected for each pixel of a projector. In some examples (such as for digital light processing (DLP) projectors), each bit plane corresponds to a single color or wavelength of light (e.g., red, green, or blue). In some such examples, a bit plane with the infrared light of a particular (e.g., pseudo-random) pattern is injected in series with the bit planes corresponding to the frames of visual content (e.g., based on visible light using the RGB bit planes). Inasmuch as the area being scanned (using the infrared bit plane) corresponds to the area on which a visual content is being projected (using the RGB bit planes), the 3D scanning of the area can be used to enable users to interact with the visual content projected using visible light. That is, if a person moves in front of the projected visual content and/or places an object in front of the projected visual content to interact with (e.g., point to something in) the projected visual content, the person or object in front of the projected visual content would be included in the 3D point cloud generated based on the infrared light projected to the same area. Particular gestures, movements, and/or shapes of the portion of the person or object represented in the 3D point cloud can be associated with particular control actions associated with the visual content. Accordingly, the 3D scanner 102 can update or modify the visual content projected using visible light based on the particular control actions associated with the 3D point cloud generated for the person and/or object in front of the image. In some examples, the image sensor 110 is a camera. In some examples, the image sensor is an infrared camera to detect the infrared light used to project the light pattern 114.

While the foregoing mentions that the projector 108 may be a DLP projector, in other examples, other types of projectors may be employed (e.g., a liquid crystal on silicon (LCoS) projector, a liquid crystal display (LCD) projector, a microLED projector, other types of projectors that implement a spatial light modulator (SLM), etc.). Further, teachings disclosed herein are not limited to visible light projectors (typically used to project visual content). As noted above, in some examples, the projector 108 only projects infrared light without being able to project visible light. Thus, teachings disclosed herein are not limited to applications in which a 3D point cloud is generated in connection with the projection of visual content. Rather, examples disclosed herein can be used to generate 30 point clouds in any type of environment and/or for any purpose. For instance, teachings disclosed herein can be implemented on a vehicle to generate a 3D point cloud of the area surrounding the vehicle.

In the illustrated example of FIG. 1, the 3D scanner 102 is represented as a unitary electronic device containing all three of the 3D scanning controller 106, the image sensor 110, and the projector 108. However, in some examples, one or both of the image sensor 110 or the projector 108 is external to and/or peripheral to an electronic device containing the 3D scanning controller 106. Further, in some examples, the image sensor 110 and the projector 108 can be implemented in distinct and separate electronic devices (with the 3D scanning controller in one of the devices and/or implemented partially or completely in a third electronic device). In some such examples, the image sensor 110 and the projector 108 are at least fixed relative to one another so that there is no relative movement between them. The 3D scanner 102 can be implemented in and/or correspond to any suitable type of electronic device such as a desktop computer, a laptop computer, a tablet, a smartphone, a television, a projector, etc. Although the 3D scanner 102 is shown with only one image sensor 110, in some examples, more than one image sensor 110 may be employed. Similarly, although only one projector 108 is shown, in some examples, more than one projector 108 may be employed.

In this example, the light 112 projected by the projector 108 corresponds to a particular light pattern 114 (e.g., an image) defined by the 3D scanning controller 106. The light pattern 114 corresponds to a particular subset of pixels in a pixel array 115 of the projector 108. That is, the pixel array 115 is defined by a two-dimensional array of pixels represented by individual boxes in the pixel array 115 of FIG. 1. The resolution of the projector 108 is defined by the number of pixels the projector 108 is able to project, which corresponds to the number of pixels in the pixel array 115. Thus, in this simple example provided for purposes of explanation, the pixel array 115 is an 8×8 array thereby defining a full resolution of 64 pixels for the projector 108. An 8×8 array is used for simplicity of explanation. However, many projectors have resolutions much higher than this and teachings disclosed herein can be adapted to projectors having any suitable resolution.

In some examples, to generate the light pattern 114, different ones of the pixels in the pixel array 115 are assigned one of two binary values (on/off, light/dark, etc.) with the light pattern 114 corresponding to the pixels that are emitting light. In the illustrated example of FIG. 1, the unshaded boxes in the pixel array 115 are representative of pixels that are ON (e.g., emitting light) whereas the shaded boxes in the pixel array 115 are representative of pixels that are OFF (e.g., not emitting light). For purposes of explanation, the pixels corresponding to the unshaded boxes are referred to as illuminated pixels, bright pixels, on pixels, or active pixels 116 and define the light pattern 114. By contrast, the pixels corresponding to the shaded boxes are referred to herein as non-illuminated pixels, dark pixels, off pixels, or inactive pixels in the light pattern. Furthermore, inasmuch as the projector 108 does not emit any light for the non-illuminated pixels (e.g., the shaded boxes in FIG. 1), the light 112 actually produced by the projector 108 corresponds exclusively to the illuminated pixels 116 (e.g., the unshaded boxes corresponding to the light pattern 114). Accordingly, unless the context indicates otherwise, whenever the term "pixels" is used herein without an adjective modifying the term, the term refers to the illuminated pixels 116 that are associated with the light pattern 114. Further, all references to the non-illuminated pixels 118 of the pixel array 115 that are not part of the light pattern 114 will be preceded by a suitable adjective (e.g., non-illuminated, dark, off, inactive, etc.) to identify them as such. In some examples, the brightness of the pixels distributed across the light pattern 114 are non-binary.

In some examples, the pixels 116 (e.g., the illuminated pixels 116) are distributed across the pixel array 115 to define the light pattern 114 in a random or pseudo-random manner. As used herein, the term random includes pseudo-random. In some examples, the density of the illuminated pixels 116 relative to all pixels (e.g., both the illuminated pixels 116 and the non-illuminated pixels 118) is relatively low. That is, in some examples, there are more non-illuminated pixels 118 than illuminated pixels 116. Stated differently, the illuminated pixels 116 are relatively sparse.

Depending on the location of the illuminated pixels 116 within the pixel array 115 (that is, depending on the arrangement of the pixels 116 in the light pattern 114), the light 112 associated with each illuminated pixel 116 will contact a different point in the real-world scene 104. In some examples, the 3D scanning controller 106 controls the image sensor 110 to operate in synchronization with the projector 108 so as to capture an image of the scene 104 at the same time that the light pattern 114 is projected onto the scene 104. As a result, an image captured by the image sensor 110 will include reflections of the illuminated pixels 116 appearing on corresponding points in the real-world scene 104 onto which each pixel is projected. Due to the sparsity of the illuminated pixels 116 of light 112 in the light pattern 114, the illuminated pixels 116 will appear spaced apart on the scene to facilitate their detection through an analysis of the captured image. In some examples, although the distribution or arrangement of the illuminated pixels 116 in the light pattern 114 may be random, the particular distribution is known. That is, the x and y position of each illuminated pixel 116 of the light pattern 114 within the two-dimensional pixel array 115 is known to enable a comparison of the known light pattern 114 relative to the pattern as it appears in the captured image of the scene 104 with the light pattern 114 projected thereon. Distortions in the light pattern 114 as captured in an image by the image sensor 110 relative to the arrangement of the illuminated pixels 116 in the known light pattern 114 arise from the shape of objects and/or surfaces in the scene 104 onto which the light pattern 114 is projected as well as the distance or depth of such objects and/or surfaces relative to the image sensor 110 and projector 108. In some examples, the 3D scanning controller 106 calculates the depth of points in the scene 104 onto which corresponding ones of the illuminated pixels 116 are projected based on the distortions in the light patterns 114 as it appears in the captured image (after being reflected off surfaces in the scene 104) relative to the light pattern 114 as initially projected from the projector 108. The calculated depths can then be used to generate a 3D point cloud of the scene. The calculation of the depths and resulting generation of the 3D point cloud are based on known triangulation techniques. In some examples, synchronized images of multiple image sensors 110 are captured to provide multiple perspectives of the scene 104 that can be analyzed through triangulation techniques to generate depth information and the resulting 3D point cloud.

Inasmuch as the illuminated pixels 116 of the light pattern 114 are relatively sparse (relative to all pixels in the pixel array 115), the points in a 3D point cloud generated based on the light pattern 114 will also be relatively sparse. As a result, the 3D point cloud will have a relatively low resolution (e.g., significantly less than the full resolution of the projector 108). In some examples, to increase the resolution of the 3D point cloud, a series of multiple different light patterns (e.g., the light patterns 114 of FIG. 1 and additional light patterns 202, 204 of FIG. 2) are projected in succession while a corresponding series of images are captured of reflections of the series of light patterns on to the scene 104 at the time of projection of each successive light pattern. Based on different arrangements of the illuminated pixels 116 in the different light patterns 114, different points in the real-world scene 104 will have light from the illuminated pixels 116 projected thereon with respect to each light pattern 114. As a result, the depth information from the different captured images can be aggregated or integrated together to generate a higher resolution 3D point cloud of the scene 104. In some examples, the different light patterns 114 are defined so that after a full set or series of the light patterns have been used, every pixel in the pixel array 115 of the projector 108 is designated at least once as an illuminated pixel 116. In this way, the 3D point cloud can be generated with the same (relatively high) resolution as the projector 108.

Figure 2:
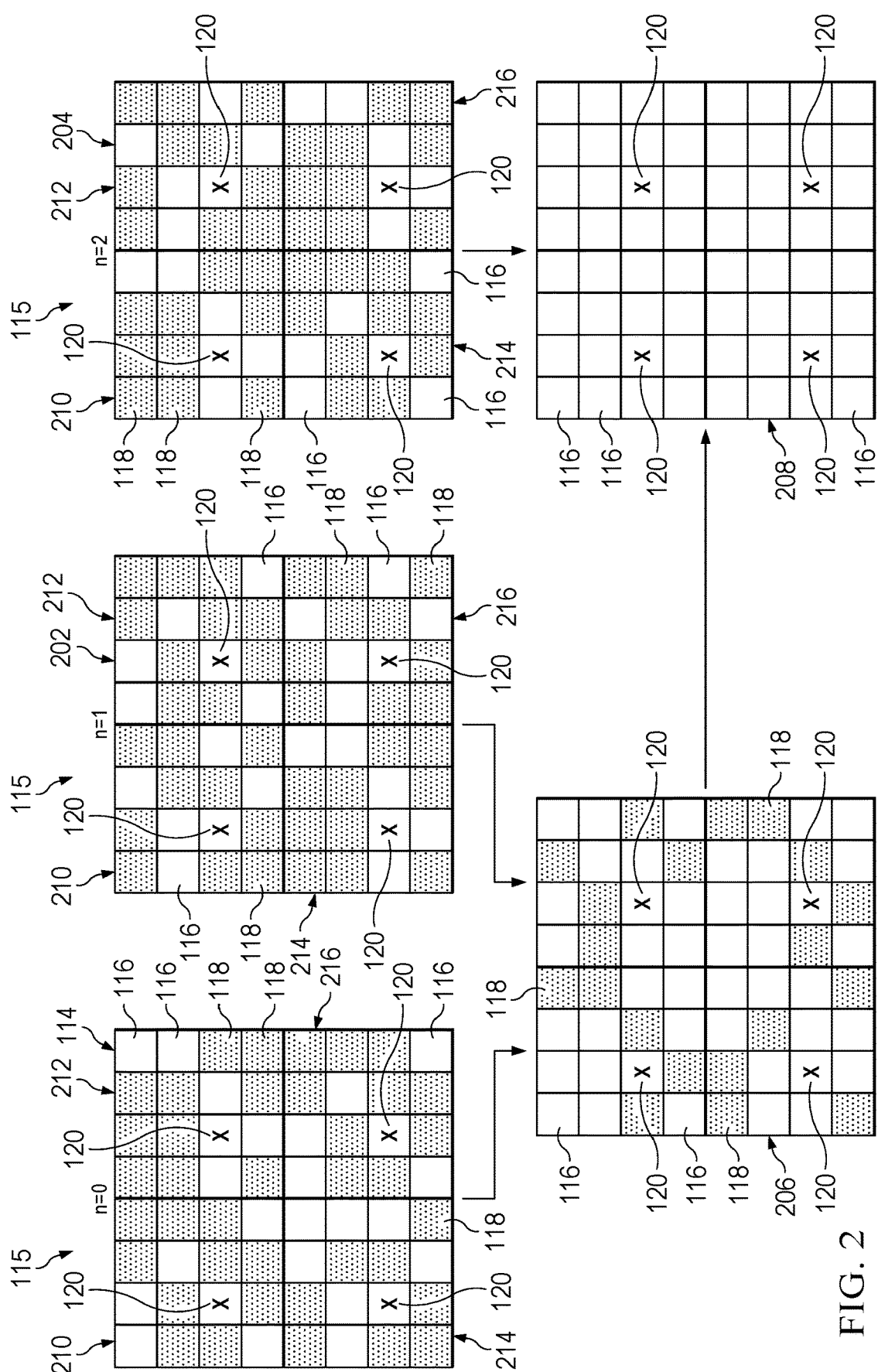
FIG. 2 illustrates three example light patterns generated in accordance with teachings disclosed herein.

The combining or aggregation of the different lights patterns to cover the full pixel array 115 is represented in FIG. 2. In particular, FIG. 2 shows a first aggregated light pattern 206 that corresponds to the combination of the first and second light patterns 114, 202 in the series of light patterns. As can be seen, due to the mutually exclusive locations of most of the illuminated pixels in the two light patterns 114, 202, the first aggregated light pattern 206 includes significantly more illuminated pixels 116 than either of the first two light patterns 202 individually. Furthermore, in this example, all of the non-illuminated pixels 118 corresponding to the gaps in the first aggregated light pattern 206 correspond to an illuminated pixel 116 in the third light pattern 204. As a result, after the third light pattern 204 has been projected (following the first two light patterns 114, 202), a final aggregated light pattern 208 (corresponding to a combination of all three light patterns 114, 202, 204) includes illuminated pixels 116 corresponding to all pixels in the pixel array 115. While the different light patterns 114, 202, 204 in the series shown in FIG. 2 aggregate to result in the projection of light 112 from every pixel in the pixel array associated with the projector 108, in other examples, less than all of the pixels may be used to reduce memory and/or processing requirements. However, such an approach will result in a reduction of the resolution of the resulting 3D point cloud generated based on the aggregation of captured images associated with the series of light patterns.

In the illustrated example, three different light patterns 114, 202, 204 are defined to aggregate and cover the full array of pixels of the projector 108. However, in other examples, any other suitable number of different light patterns may be used (e.g., 4, 5, 6, 10, 12, 15, 16, 32, 64, etc.). Notably, as the number of different light patterns used in the series increases, the sparsity of illuminated pixels in any given light pattern increases. That is, for three light patterns (as shown in the illustrated example), the number of illuminated pixels 116 in one of the light patterns 114, 202, 204 is approximately one third of all pixels in the full array of pixels. By contrast, for four light patterns in the series, the number of illuminated pixels 116 in one of the light patterns is approximately one fourth of all pixels in the pixel array. In some examples, the same number of illuminated pixels is used in each light pattern so that the sparsity of the pixels remains constant across all light patterns. However, in other examples, some light patterns may include more illuminated pixels than other light patterns.

While the time multiplexing approach disclosed above (based on the projection of spatiotemporal light patterns) can facilitate the generation of high-resolution 3D point clouds, the approach is limited to situations when the scene 104 is stationary. If the scene 104 includes movement or motion, the reflections of the projected light patterns 114, 202, 204 captured in the series of images of the scene 104 cannot be combined or aggregated together in a reliable manner. Accordingly, in some examples, the 3D scanner 102 analyzes successive ones of the captured images to detect the presence of motion and adapt the 3D point cloud generation process as appropriate. In particular, if no motion is detected, the images are analyzed in combination to produce a relatively high-resolution 3D point cloud. However, if motion is detected in the scene 104, the 3D scanner 102 determines whether at least some regions of the scene were stationary across the series of images. If so, the portions of the captured images associated with the stationary regions of the scene 104 are combined as described above to generate relatively high-resolution localized point clouds for the corresponding regions of the scene. On the other hand, for regions of the scene 104 that are determined to include motion, less than all the captured images are used to generate lower resolution localized point clouds of the associated region. More particularly, in some examples, only the last (most recently) captured image is used. In some examples, if a subset of the images in the series of images (though not all) are determined to correspond to a stationary scene, then the subset of the images may be analyzed in combination to generate a localized point cloud with a higher resolution than is possible using only one image but not as high as would be possible if all images were used. Once separate localized point clouds have been generated for each region of the captured images, the localized point clouds can be combined to generate a final full 3D point cloud of the scene 104.

In some examples, the detection of motion in the scene 104 across a series of images capturing reflections of different light patterns projected onto the scene 104 is accomplished using reference pixels 120 (designated by an "X" in the illustrated examples) in the different light patterns 114, 202, 204. As used herein, a reference pixel is an illuminated pixel 116 that is included in each of the different light patterns at the same location (e.g., same x and y coordinates within the pixel array 115 of the projector 108). That is, as shown with reference to the different light patterns 114, 202, 204 in FIG. 2, while most of the illuminated pixels 116 change positions between the different light patterns 114, 202, 204, the reference pixels 120 are located in the same position in each light pattern 114, 202, 204. Thus, while a majority of the illuminated pixels 116 in each of the different light patterns are non-overlapping (e.g., have mutually exclusive positions), at least some of the illuminated pixels 116 (e.g., the reference pixels 120) are overlapping or common (e.g., have the same position) across the different light patterns. For this reason, in some examples, the number of illuminated pixels in any given light pattern is slightly higher than the full number of pixels in the pixel array divided by the number of light patterns used in series (as mentioned above) because the light patterns include the reference pixels 120.

Figure 1A:
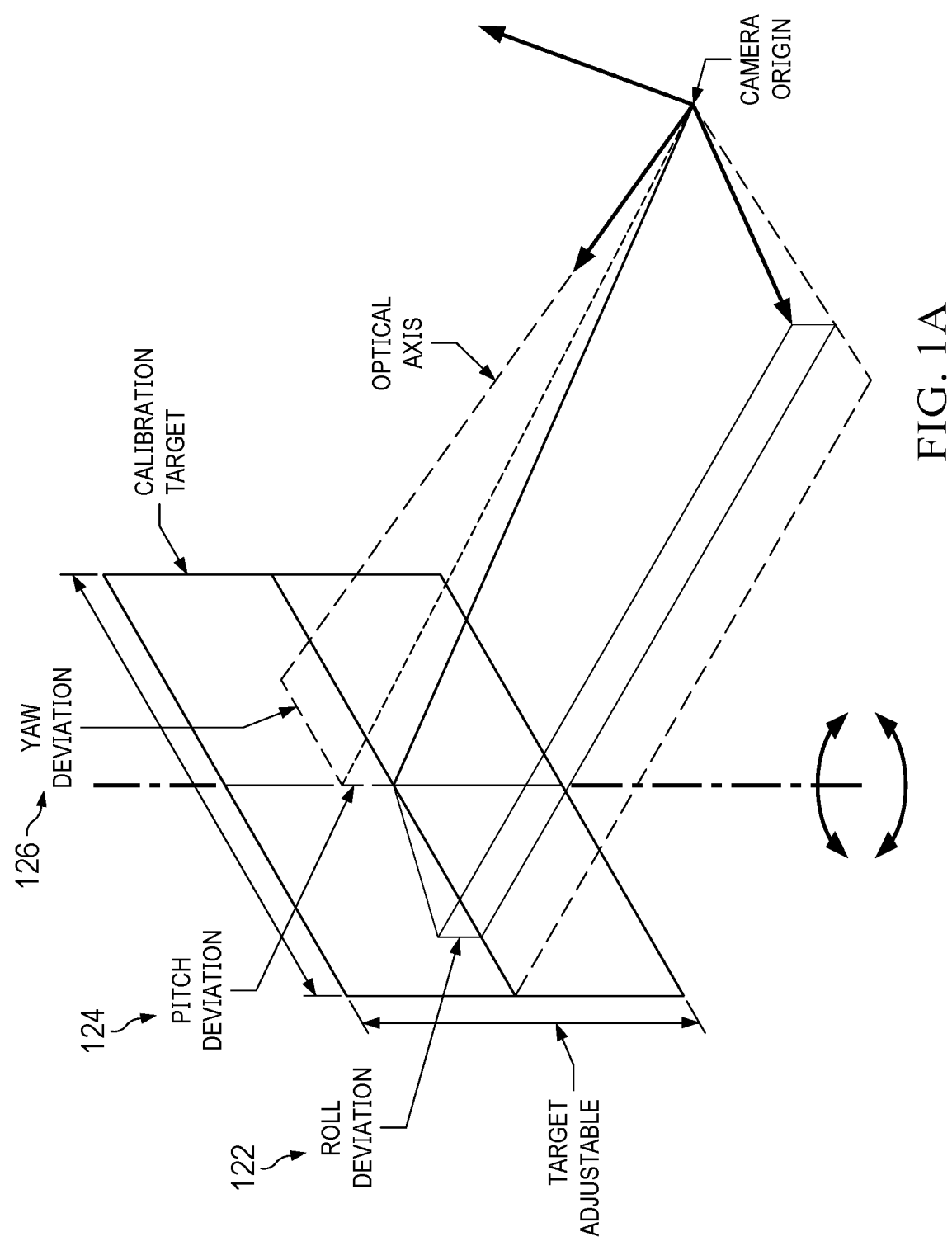
FIG. 1A illustrates the different degrees of freedom between a camera and a target being imaged by the camera.

Inasmuch as the reference pixels 120 are at the same position in each light pattern 114, 202, 204, the light 112 corresponding to the reference pixels 120 should hit the same point in the real-world scene 104 when each light pattern 114, 202, 204 is projected onto the scene 104 so long as the scene is not moving relative to the 3D scanner 102 due to motion within the scene 104, motion of the 3D scanner 102 relative to the scene 104, or both. Even if the 3D scanner 102 is moving relative to the scene 104, so long as the scene itself is stationary, it may still be possible to combine the captured images. This is possible if there is a solution to the six degrees of freedom problem for the image sensor 110 across the different images captured in connection with the projection of each of the light patterns 114, 202, 204. The six degrees of freedom problem involves the determination of the pose (e.g., position (X, Y, and Z coordinates in 3D space) and orientation (pitch, yaw, and roll)) of the image sensor 110 relative to the scene 104 when each of the images of the scene 104 is captured in connection with the projection of each of the light patterns 114, 202, 204. These six degrees of freedom can be determined based on the deviations (e.g., roll deviation 122, pitch deviation 124, and yaw deviation 126) of particular pixels in an image of a target captured by the image sensor 110 as represented in FIG. 1A. More particularly, solving the six degrees of freedom problem may involve the use of fiducial markers in the scene 104 that can be compared across the different images. In examples disclosed herein, the projection of the reference pixels 120 onto the scene 104 serves as the fiducial markers because the reference pixels 120 are at fixed positions across the different light patterns 114, 202, 204 and, therefore, should appear at the same points within the scene 104 across the different captured images. To fully solve the six degrees of freedom problem, at least six fiducial markers (e.g., six reference pixels 120) are needed in each image being analyzed. Thus, the simplified example light patterns 114, 202, 204 provided for purposes of explanation would be insufficient to solve the problem because they only have four reference pixels 120. However, as explained above, most projectors include far more pixels than an 8×8 array. In some examples, each light pattern includes more than six reference pixels 120.

In some examples, a solution to the six degrees of freedom problem (derived using any suitable technique now known or later developed) may be calculated with a margin of error. In examples where the error satisfies (e.g., is less than or equal to) an error threshold, the different captured images can be combined through shifting and/or warping each image in accordance with the calculated pose of the image sensor 110 when each image was captured based on the assumption that no motion is present (e.g., the scene 104 is stationary and the 3D scanner 102 is not moving relative to the scene 104). As a result, the depth information (e.g., 3D point cloud) generated based on the light pattern 114, 202, 204 captured in each image can similarly be combined or aggregated into a final high resolution point cloud. On the other hand, if the error in the solution to the six degrees of freedom problem does not satisfy (e.g., exceeds) the error threshold (or no solution can be calculated), the 3D scanner 102 determines that the scene 104 included motion when the images were captured based on the assumption that motion is present (e.g., either the scene 104 (or a part thereof) is non-stationary and/or the 3D scanner 102 is moving relative to the scene 104). As a result, the depth information from the different images cannot reliably be combined. In such examples, the 3D scanner 102 generates a lower resolution 3D point cloud based on less than all of the images. In some examples, only one of the images (e.g., the most recently captured image) is used to generate the 3D point cloud.

In some examples, whether all images are used to generate the 3D point cloud or less than all (or only one) are used is suitably adapted between different portions of the images depending on whether those portions are determined to be associated with the detected motion or are determined to be associated with a stationary part of the scene. Stationary areas can be identified in first regions in the images (captured by the image sensor 110) associated with areas of the series of images near reference pixels 120 in which reflections of the projected reference pixels 120 in the images of the series of images are not different (e.g., within a threshold). More particularly, in some examples, if motion is determined to be within the scene 104 (based on the margin of error in the solution to the six degrees of freedom exceeding the threshold), the 3D scanner compares the location of the reflection of individual ones of the projected reference pixels 120 captured in separate ones of the series of images of the scene 104. If the point of reflection of the reference pixel 120 remains stationary across the different captured images, the 3D scanner 102 determines that a portion of the images surrounding the fixed location of the reference pixel 120 corresponds to an area of the scene 104 that was stationary during the capture of the images. In such examples, the depth information associated with the relevant portion of the different images in the series is combined or aggregated to generate a high resolution 3D point cloud for the corresponding area of the scene 104. By contrast, if the reflection of a particular reference pixel 120 shifts or moves between different ones of the captured images, the 3D scanner 102 determines that the portion of the images in the immediate vicinity of the reference pixel 120 corresponds to an area of the scene 104 that included motion during the capture of the images. In such examples, the depth information associated with the relevant portion of the different images cannot reliably be combined or aggregated. Therefore, the 3D scanner 102 generates a lower resolution 3D point cloud for the corresponding area of the scene 104 based on less than all of the images. More particularly, if the location of the reference pixel 120 shifts between each image, than only one image is used. However, in some examples, if the reference pixel 120 is at a fixed location with more than one image (though not all), then each of the images where the reference pixel 120 is at the same location are used in combination. The portions of the images surrounding and/or in the vicinity of the reference pixels 120 used in this motion adaptive methodology can be of any suitable shape and size. In some examples, the size and shape of the individual portions of the images are such that the separate portions collectively cover all portions of the images that capture any of the reflections of the pixels projected by the projector 108. In some examples, the size and shape of the individual portions of the images are defined to correspond to distinct (e.g., non-overlapping) portions of the array of pixels projected by the projector 108. However, in other examples, at least some pixels projected by the projector 108 may be included in different portions of the images analyzed in the motion adaptive approach outlined above.

A challenge with using time multiplexed light patterns 114, 202, 204 to generate 3D point clouds is the memory space required to store the different light patterns 114, 202, 204 to be projected onto the scene 104 at different points in time. Accordingly, in some examples, the light patterns 114, 202, 204 are generated from a set of much smaller light patterns referred to herein as light pattern tiles. More particularly, in some examples, different ones of the light pattern tiles in the set of tiles are selected to be included in different regions of the pixel array associated with the full light patterns 114, 202, 204. For instance, in the illustrated example, of FIG. 2, each of the light patterns 114, 202, 204 include and/or are defined by an array of distinct regions that are non-overlapping and contiguous. More particularly, in this example, the light patterns 114, 202, 204 are divided into four separate regions 210, 212, 214, 216 of the pixel array 115 (demarcated by the thick lines) corresponding to a 4×4 array of pixels. Thus, across all three light patterns 114, 202, 204 there is a total of twelve regions 210, 212, 214, 216. However, the arrangement of the illuminated pixels 116 in each of the twelve regions is defined by one of only three light pattern tiles, each of which is sized to match ones of the regions 210, 212, 214, 216 in the light patterns 114, 202, 204.

Figure 3:
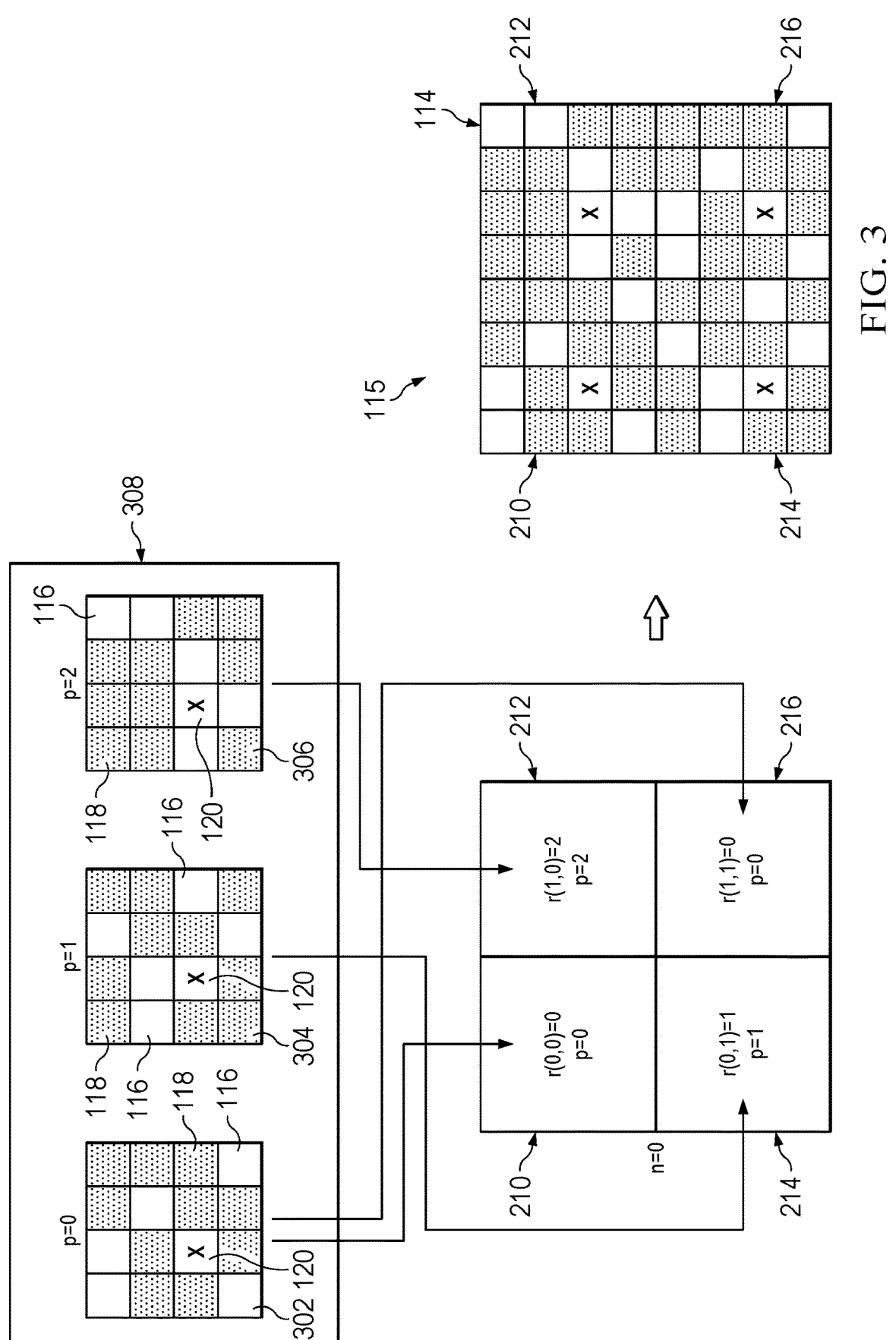
FIGS. 3-5 illustrate the generation of the example light patterns of FIG. 2.

FIG. 3 illustrates the process of generating the first light pattern 114 of FIGS. 1 and 2. As mentioned above, the light pattern 114 (as well as the other light patterns 202, 204) are generated based on the tiling or arrangement of three tiles 302, 304, 306 stored in a library or dictionary 308 of light pattern tiles (also referred to herein simply as tiles for short). In this example, the library 308 includes three different tiles 302, 304, 306. However, any other suitable number of tiles may be used (e.g., 4, 5, 6, 10, 12, 15, 16, 32, 64, etc.). In some examples, the number of tiles 302, 304, 306 corresponds to the number of full light patterns 114, 202, 204 that are needed to cover an entirety of the pixel array 115 when aggregated together. However, in other examples, the number of tiles may be greater than the number of light patterns needed to cover the full pixel array 115.

In this example, each of the tiles 302, 304, 306 has a same size and shape so that each tile 302, 304, 306 can be located in the same position and take up the same amount of space within a full light pattern associated with the full frame of the projector 108. In some examples, the size and shape of the tiles 302, 304, 306 are defined by a spatial length (L) and a spatial width (W). In this example, the tiles 302, 304, 306 correspond to a 4×4 pixel array (e.g., L=4 and W=4) for simplicity of explanation. In other examples, the tiles 302, 304, 306 may be a different shape and/or different size than what is shown. In some examples, a different number of tiles may be used. As shown in the illustrated example, the size of the tiles 302, 304, 306 is smaller than the size of the pixel array 115 of the projector and/or the associated light patterns 114, 202, 204. More particularly, in some examples, the tiles 302, 304, 306 are sized to match individual ones of the regions 210, 212, 214, 216 of the full light patterns 114, 202, 204. As a result, storing the tiles 302, 304, 306 requires significantly less memory than storing the full light patterns 114, 202, 204 that are generated using the tiles 302, 304, 306. Further, the number of tiles 302, 304, 306 within the library 308 is less than the number of regions 210, 212, 214, 216 of the full light patterns 114, 202, 204. As a result, at least one of the tiles 302, 304, 306 is used multiple times (e.g., more than once) within any given one of the full light patterns 114, 202, 204.

In some examples, each of the tiles 302, 304, 306 has a dot number (D) defined as the number of illuminated pixels within the L×W pattern associated with each tile. In this example, the dot number is D=6. In other examples, a different dot number can be used. The particular dot number can depend on the overall size of the tiles 302, 304, 306, as well as the sparsity of illuminated pixels within each tile. In some examples, the dot number can differ between different ones of the tiles 302, 304, 306.

In some examples, the distribution or arrangement of the pixels in the separate tiles 302, 304, 306 follows similar properties to the illuminated pixels 116 distributed across the full light patterns 114, 202, 204 as disclosed above. That is, the tiles 302, 304, 306 are relatively sparsely populated with illuminated pixels 116 meaning that a majority of the pixel array 115 associated with each tile 302, 304, 306 corresponds to non-illuminated pixels 118. Further, the illuminated pixels 116 are arranged in a manner so that illuminated pixels 116 do not overlap between different ones of the tiles 302, 304, 306 except for a reference pixel 120 that is in a common position across all of the tiles 302, 304, 306. In this example, each tile 302, 304, 306 includes only one reference pixel 120. However, in other examples, the tiles 302, 304, 306 may include more than one reference pixel 120. In some examples, the individual tiles 302, 304, 306 and their associated pattern of pixels may be generated and stored in advance of any 3D scanning operations (e.g., before the full light patterns 114, 202, 204 are needed to project onto the scene 104).

The library 308 may correspond to any suitable type of data structure (e.g., a lookup table (LUT)) that is able to maintain and define a successive order for the tiles 302, 304, 306 with each tile corresponding to a particular position within the order of the tiles. In the illustrated example, the order of the positions of the tiles 302, 304, 306 is represented by the pattern number (p) listed below each tile 302, 304, 306. That is, the first tile 302 is in the first position (corresponding to p=0), the second tile 304 is in the second position (corresponding to p=1), and the third tile 306 is in the third position (corresponding to p=2). In some examples, the sparsity and arrangement of illuminated pixels 116 within the tiles 302, 304, 306 are defined based on a temporal depth (T). As used herein, the temporal depth defines the number of different ones of the tiles 302, 304 306 that would need to be projected to the same location to have at least one illuminated pixel projected from each pixel position within the L×W array. The temporal depth also corresponds to the number of different full light patterns (e.g., the light patterns 114, 202, 204) that would need to be projected in series onto a scene (e.g., the scene 104) to fully cover the pixel array 115 of the projector. Thus, in the illustrated example, the temporal depth is 3 because it takes all three of the tiles 302, 304, 306 in combination and/or all three full light patterns 114, 202, 204 in combination to cover all pixel positions within the corresponding pixel array 115. The temporal depth depends on the size of the tiles 302, 304, 306 and the dot number associated with the tiles 302, 304, 306. Specifically, to ensure coverage of all pixels, the temporal density needs to be greater than or equal to (L×W−1)/(D−1). In some examples, the total number of tiles 302, 304, 306 stored in the library 308 is the same as the temporal depth. However, in other examples, the number of tiles 302, 304, 306 may be higher than the temporal depth.

The temporal depth applies both to the individual tiles 302, 304, 306 and the full light patterns 114, 202, 204 because the full light patterns 114, 202, 204 are generated by populating the different regions 210, 212, 214, 216 of the full frame of the projector 108 corresponding to the pixel array 115. More particularly, in some examples, different ones of the tiles 302, 304, 306 are randomly selected to be assigned to different ones of the regions 210, 212, 214, 216 to generate the first light pattern 114. Expressed mathematically, the pattern number (p) corresponding to the particular position in the ordering of the tiles 302, 304, 306 used to identify the particular tile 302, 304, 306 to be located at a particular region 210, 212, 214, 216 (defined by an x-y tile position) can be expressed mathematically as follows:

$$p=(n+r(x,y))\% \; T \qquad \text{Eq. 1}$$

where T is the temporal depth described above, n is a current temporal count ranging from $0 \leq n < T$, $r(x,y)$ is a random integer value for the x-y tile position ranging from $0 \leq r(x,y) < T$, and % is the modulo operator.

Example random values ($r(x,y)$) and corresponding pattern numbers (p) resulting therefrom for each region 210, 212, 214, 216 are shown in the illustrated example of FIG. 3 which corresponds to the initial time count of n=0. As shown in the illustrated example, both the first region 210, and the fourth region 216 were randomly assigned the value of 0, thereby resulting in the pattern number of p=0 being selected for those regions. Thus, as represented in FIG. 3, the first tile 302 (corresponding to p=0 associated with the first position in the tile order) is designated in both the first and fourth regions 210, 216. The second region 212 was randomly assigned the number of 2, thereby resulting in the third tile 306 (corresponding to the pattern number of p=2 associated with the third position in the tile order) being designated for the second region 212. Finally, the third region 214 was randomly assigned the number of 1, thereby resulting in the second tile 304 (corresponding to the pattern number of p=1 associated with the second position in the tile order) being designated for the third region 212.

Figure 4:
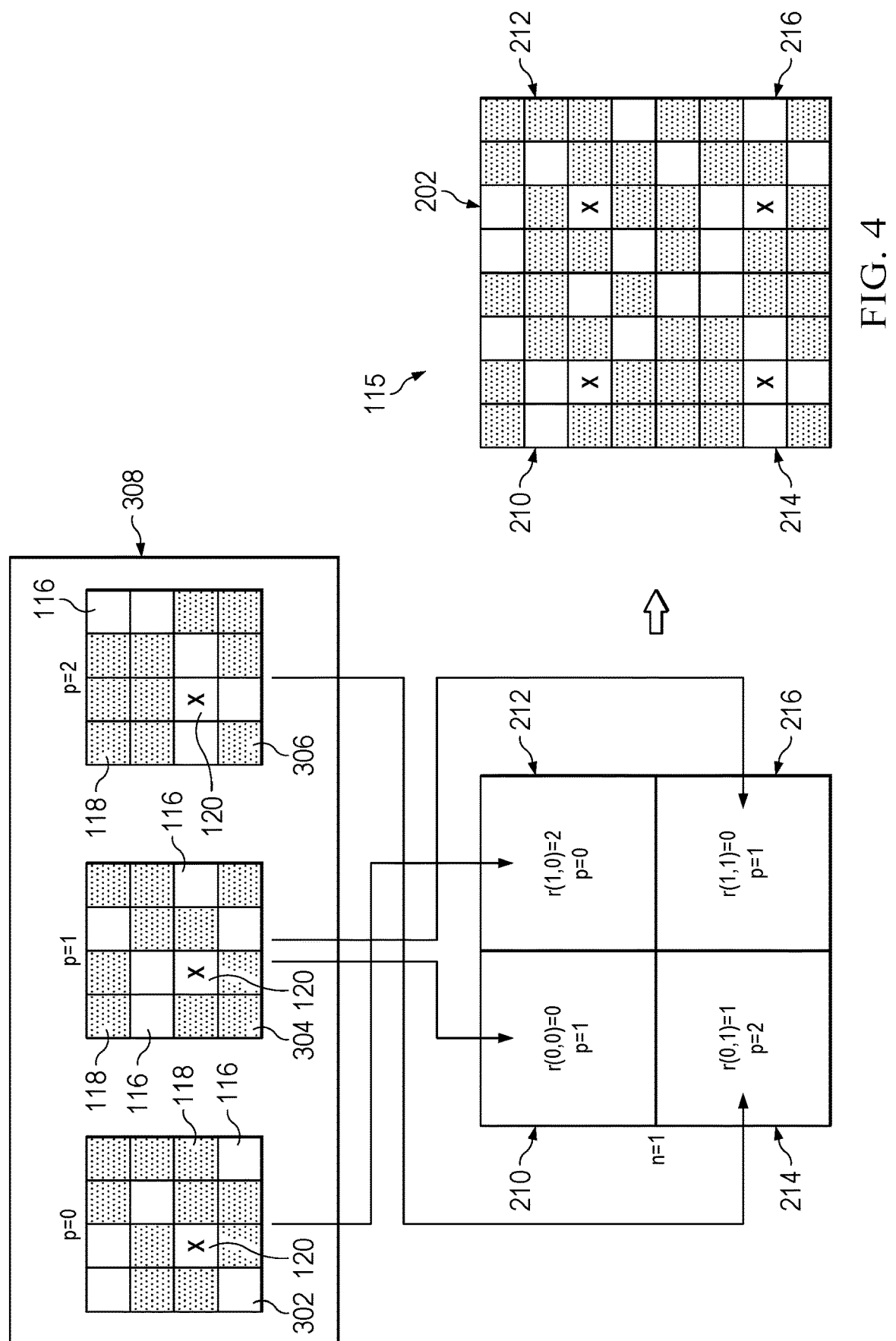
Figure 5:
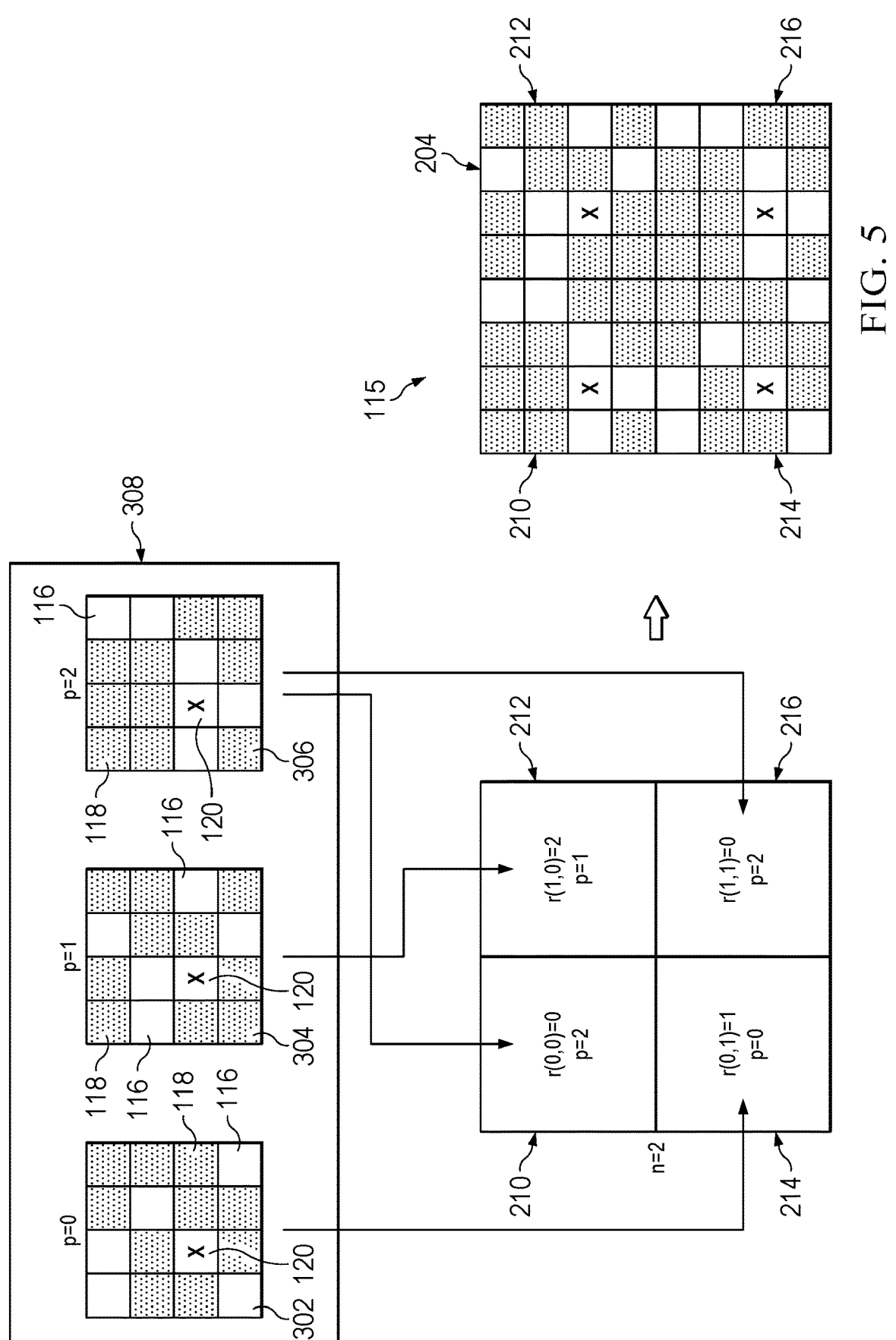

Equation 1 can be used similarly to generate the second and third light patterns 202, 204 as illustrated in FIGS. 3 and 4. However, the same random values (r (x,y)) used for the first light pattern 114 are reused for the subsequent light patterns 202, 204. Thus, the only value that changes in equation 1 between successive ones of the light patterns is the temporal count (n). The effect of equation 1 is that the tiles 302, 304, 306 are randomly assigned to the different regions 210, 212, 214, 216 for the first light pattern 114 based on first positions within the order of the tiles in the library 308 determined for each region based on the randomly generated number. Then, for each subsequent light pattern, different ones of the tiles 302, 304, 306 are assigned to the different regions 210, 212, 214, 216 based on subsequent positions within the order of the tiles in the library 308, where the subsequent positions correspond to an increment through the order of the tiles relative to the previous (e.g., first) positions within the order. The result of this process is that each tile 302, 304, 306 in the previous light pattern is replaced by the next tile 302, 304, 306 in the ordering of the tiles in the library 308. If a particular region 210, 212, 214, 216 includes the last tile 306 in the library 308 in the illustrated example, that particular region 210, 212, 214, 216 will be populated with the first tile 302 in the library 308 for the next subsequent light pattern. In other words, while the first light pattern 114 is generated based on a random assignment of the tiles 302, 304, 306 to the different regions in 210, 212, 214, 216, the second and third light patterns 202, 204 are based on the same random assignment used for the first light pattern 114 but result in different tiles in the regions 210, 212, 214, 216 by incrementing through the order of the tiles 302, 304, 306 in the library. Stated differently, the arrangement of the tiles 302, 304, 306 in subsequent light patterns 202, 204 is different than but based on the arrangement of the tiles 302, 304, 306 used in the first light pattern 114. In other words, a second (or subsequent) light pattern 202, 204 in a series of light patterns is generated based on the first (or previous) light pattern 114, where assignment of the light pattern tiles 302, 304, 306 to corresponding ones of the regions 210, 212, 214, 216 in the second light pattern are assigned to be different than the light pattern tiles 302, 304, 306 in the same corresponding ones of the region 210, 212, 214, 216 in the first light pattern 114. Thus, while the first tile 302 was assigned to the first and fourth regions 210, 216 for the first light pattern 114 (when n=0) as shown in FIG. 3, the second tile 304 is assigned to the first and fourth regions 210, 216 for the second light pattern 202 (when n=1) as shown in FIG. 4. Based on this progression, the third tile 306 is assigned to the first and fourth regions 210, 216 for the third light pattern 204 (when n=2) as shown in FIG. 5. The other regions 212, 214 similarly progress through the tiles 302, 304, 306 in the library 308 as successive ones of the light patterns 202, 204 are generated based on the initial random assignment for the first light pattern 114.

Figure 6:
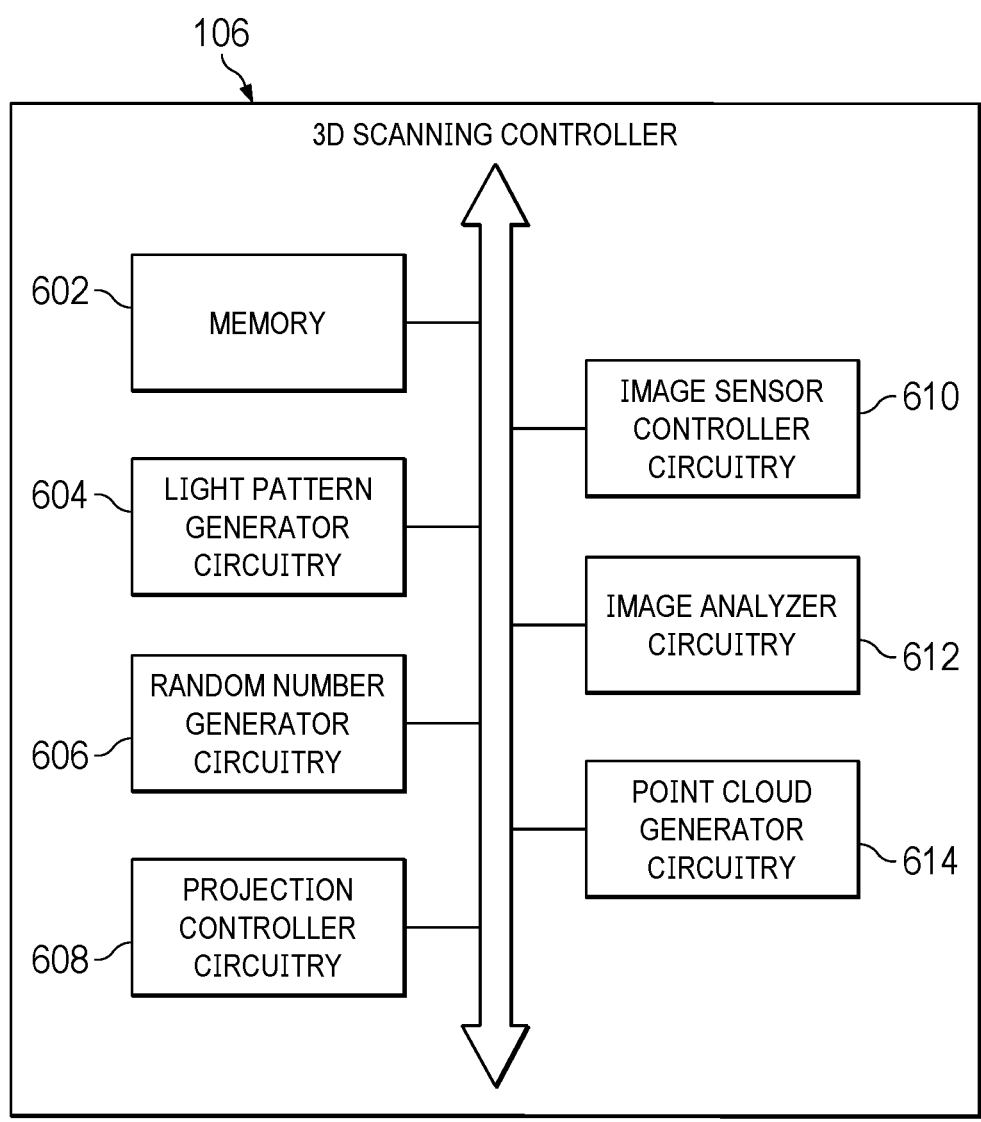
FIG. 6 is a block diagram illustrating an example implementation of the example 3D scanning controller of FIG. 1.

FIG. 6 is a block diagram of the example 3D scanning controller 106 to generate 3D point clouds of a scene. The 3D scanning controller 106 of FIG. 6 may be instantiated (e.g., creating an instance of, bring into being for any length of time, materialize, implement, etc.) by processor circuitry such as a central processing unit executing instructions. Additionally or alternatively, the 3D scanning controller 106 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by microprocessor circuitry executing instructions to implement one or more virtual machines and/or containers.

As shown in FIG. 6, the example 3D scanning controller 106 includes example memory 602, example light pattern generator circuitry 604, example random number generator circuitry 606, example projection controller circuitry 608, example image sensor controller circuitry 610, example image analyzer circuitry 612, and example point cloud generator circuitry 614.

The example memory 602 stores a data structure corresponding to the library 308 containing the different light pattern tiles (e.g., the tiles 302, 304, 306). In some examples, the light pattern generator circuitry 604 generates full light patterns (e.g., the light patterns 114, 202, 204) by populating different regions (e.g., the different regions 210, 212, 214, 216) of the full frame of the pixel array 115 of the projector 108 with different ones of the tiles 302, 304, 306 stored in the library 308. As described above, the light pattern generator circuitry 604 generates the first light pattern 114 in a series of light patterns to be used in combination to produce a high resolution 3D point cloud by randomly assigning ones of the tiles 302, 304, 306 to the different regions 210, 212, 214, 216. In some examples, the random assignment is based on values generated by the random number generator circuitry 606. In some examples, the random number generator circuitry 606 is instantiated by processor circuitry executing random number generator instructions and/or configured to perform operations such as those represented by the flowcharts of FIGS. 10-12. In some examples, the random number generator circuitry 606 is integrated with and/or correspond to the light pattern generator circuitry 604 such that the light pattern generator circuitry 604 performs the function of the random number generator circuitry 606. In some examples, the light pattern generator circuitry 604 generates subsequent light patterns 202, 204 in the series by assigning different ones of the tiles 302, 304, 306 to each of the regions 210, 212, 214, 216 by progressing through the ordering of the tiles 302, 304, 306 as stored in the library 308 (e.g., in the example memory 602). In some examples, the light pattern generator circuitry 604 is instantiated by processor circuitry executing light pattern generator instructions and/or configured to perform operations such as those represented by the flowcharts of FIGS. 10-12.

The example projection controller circuitry 608 controls the operation of the projector 108 to cause the projection of the different light patterns 114, 202, 204 generated by the light pattern generator circuitry 604. In some examples, the light patterns 114, 202, 204 are projected in the same order as they are generated by the light pattern generator circuitry 604. In some examples, the projection controller circuitry 608 is instantiated by processor circuitry executing projection controller instructions and/or configured to perform operations such as those represented by the flowcharts of FIGS. 10-12.

The example image sensor controller circuitry 610 controls the operation of the image sensor 110 to cause the image sensor 110 to capture images of a scene onto which the different light patterns 114, 202, 204 are projected and/or captures reflections of the different light patterns 114, 202, 204 projected onto the scene. In some examples, the projection controller circuitry 608 and the image sensor controller circuitry 610 operate in combination to synchronize the projection of the light patterns 114, 202, 204 by the projector 108 and the capture of the same by the image sensor 110. In some examples, the image sensor controller circuitry 610 is instantiated by processor circuitry executing image sensor controller instructions and/or configured to perform operations such as those represented by the flowcharts of FIGS. 10-12.

The example image analyzer circuitry 612 analyzes the images captured by the image sensor 110 to identify the points in the captured images corresponding to the projected pixels in the corresponding light patterns 114, 202, 204. Further, in some examples, the image analyzer circuitry 612 identifies the points corresponding to the reference pixels 120 in the light pattern and uses such points as fiducial markers to calculate a solution to the six degrees of freedom problem. In some examples, the image analyzer circuitry 612 also calculates the margin of error associated with any derived solution to the six degrees of freedom problem. In some examples, the image analyzer circuitry 612 also aligns different ones of the captured images based on the solution to the six degrees of freedom problem. In some examples, the image analyzer circuitry 612 is instantiated by processor circuitry executing image analyzer instructions and/or configured to perform operations such as those represented by the flowcharts of FIGS. 10-12.

The example point cloud generator circuitry 614 generates a 3D point cloud based on the appearance of the reflections of the light patterns 114, 202, 204 as captured in the images analyzed by the image analyzer circuitry 612. More particularly, the point cloud generator circuitry 614 determines depth information for each point in the images corresponding to each projected pixel captured in each image. In some examples, the depth information is aggregated or integrated across each captured image in the series of images associated with the series of light patterns. However, in other examples, the 3D point cloud is based on depth information in less than all images in the series. In some examples, whether some or all the images are used is determined based on whether the margin of error in the solution to the six degrees of freedom problem satisfies an error threshold. When the error does not satisfy the threshold, the example point cloud generator circuitry 614 implements a motion adaptive approach in which portions of multiple ones of the images are used to generate the point cloud if the reference pixels 120 within the portions of the images remain at a fixed location across the different images. On the other hand, if the location of the reference pixel 120 shifts or moves between different ones of the images, the corresponding portion of the most recently captured image is used by itself to generate the 3D point cloud. In some examples, the point cloud generator circuitry 614 is instantiated by processor circuitry executing point cloud generator instructions and/or configured to perform operations such as those represented by the flowcharts of FIGS. 10-12. In some examples, the image analyzer circuitry 612 and the point cloud generator circuitry 614 are integrated and/or combined together to operate as a unit.

In some examples, the 3D scanning controller 106 includes means for generating a light pattern. For example, the means for generating may be implemented by light pattern generator circuitry 604. In some examples, the light pattern generator circuitry 604 may be instantiated by processor circuitry such as the example processor circuitry 1312 of FIG. 13. For instance, the light pattern generator circuitry 604 may be instantiated by the example microprocessor 1400 of FIG. 14 executing machine executable instructions such as those implemented by at least blocks 1002, 1008, 1102, 1108, 1112, 1114, 1116, and 1118 of FIGS. 10 and 11. In some examples, the light pattern generator circuitry 604 may be instantiated by hardware logic circuitry, which may be implemented by an ASIC, XPU, or the FPGA circuitry 1500 of FIG. 15 structured to perform operations corresponding to the machine readable instructions. Additionally or alternatively, the light pattern generator circuitry 604 may be instantiated by any other combination of hardware, software, and/or firmware. For example, the light pattern generator circuitry 604 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the 3D scanning controller 106 includes means for generating a random number (e.g., a pseudorandom number). For example, the means for generating the random number may be implemented by the random number generator circuitry 606 (or, alternatively, the light pattern generator circuitry 604 that performs the function of the random number generator circuitry 606). In some examples, the random number generator circuitry 606 may be instantiated by processor circuitry such as the example processor circuitry 1312 of FIG. 13. For instance, the random number generator circuitry 606 may be instantiated by the example microprocessor 1400 of FIG. 14 executing machine executable instructions such as those implemented by at least block 1110 of FIG. 11. In some examples, random number generator circuitry 606 may be instantiated by hardware logic circuitry, which may be implemented by an ASIC, XPU, or the FPGA circuitry 1500 of FIG. 15 structured to perform operations corresponding to the machine readable instructions. Additionally or alternatively, the random number generator circuitry 606 may be instantiated by any other combination of hardware, software, and/or firmware. For example, the random number generator circuitry 606 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the 3D scanning controller 106 includes means for controlling a projector (e.g., the projector 108). For example, the means for controlling may be implemented by projection controller circuitry 608. In some examples, the projection controller circuitry 608 may be instantiated by processor circuitry such as the example processor circuitry 1312 of FIG. 13. For instance, the projection controller circuitry 608 may be instantiated by the example microprocessor 1400 of FIG. 14 executing machine executable instructions such as those implemented by at least block 1004 of FIG. 10. In some examples, the projection controller circuitry 608 may be instantiated by hardware logic circuitry, which may be implemented by an ASIC, XPU, or the FPGA circuitry 1500 of FIG. 15 structured to perform operations corresponding to the machine readable instructions. Additionally or alternatively, the projection controller circuitry 608 may be instantiated by any other combination of hardware, software, and/or firmware. For example, the projection controller circuitry 608 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the 3D scanning controller 106 includes means for controlling an image sensor (e.g., the image sensor 110). For example, the means for controlling may be implemented by the image sensor controller circuitry 610. In some examples, the image sensor controller circuitry 610 may be instantiated by processor circuitry such as the example processor circuitry 1312 of FIG. 13. For instance, the image sensor controller circuitry 610 may be instantiated by the example microprocessor 1400 of FIG. 14 executing machine executable instructions such as those implemented by at least block 1006 of FIG. 10. In some examples, the image sensor controller circuitry 610 may be instantiated by hardware logic circuitry, which may be implemented by an ASIC, XPU, or the FPGA circuitry 1500 of FIG. 15 structured to perform operations corresponding to the machine readable instructions. Additionally or alternatively, the image sensor controller circuitry 610 may be instantiated by any other combination of hardware, software, and/or firmware. For example, the image sensor controller circuitry 610 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the 3D scanning controller 106 includes means for analyzing and/or processing images. For example, the means for analyzing and/or processing may be implemented by image analyzer circuitry 612. In some examples, the image analyzer circuitry 612 may be instantiated by processor circuitry such as the example processor circuitry 1312 of FIG. 13. For instance, the image analyzer circuitry 612 may be instantiated by the example microprocessor 1400 of FIG. 14 executing machine executable instructions such as those implemented by at least blocks 1010, 1012, 1014, 1202, 1206, 1208, and 1216 of FIGS. 10 and 12. In some examples, the image analyzer circuitry 612 may be instantiated by hardware logic circuitry, which may be implemented by an ASIC, XPU, or the FPGA circuitry 1500 of FIG. 15 structured to perform operations corresponding to the machine readable instructions. Additionally or alternatively, the image analyzer circuitry 612 may be instantiated by any other combination of hardware, software, and/or firmware. For example, the image analyzer circuitry 612 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the 3D scanning controller 106 includes means for generating a point cloud. For example, the means for determining may be implemented by point cloud generator circuitry 614. In some examples, the point cloud generator circuitry 614 may be instantiated by processor circuitry such as the example processor circuitry 1312 of FIG. 13. For instance, the point cloud generator circuitry 614 may be instantiated by the example microprocessor 1400 of FIG. 14 executing machine executable instructions such as those implemented by at least blocks 1016, 1018, 1202, 1206, 1210, 1212, 1214, and 1216 of FIGS. 10 and 12. In some examples, the point cloud generator circuitry 614 may be instantiated by hardware logic circuitry, which may be implemented by an ASIC, XPU, or the FPGA circuitry 1500 of FIG. 15 structured to perform operations corresponding to the machine readable instructions. Additionally or alternatively, the point cloud generator circuitry 614 may be instantiated by any other combination of hardware, software, and/or firmware. For example, the point cloud generator circuitry 614 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the 3D scanning controller 106 of FIG. 1 is illustrated in FIG. 6, one or more of the elements, processes, and/or devices illustrated in FIG. 6 may be combined, divided, re-arranged, omitted, eliminated, and/or implemented in any other way. Further, the example memory 602, the example light pattern generator circuitry 604, the example random number generator circuitry 606, the example projection controller circuitry 608, the example image sensor controller circuitry 610, the example image analyzer circuitry 612, the example point cloud generator circuitry 614, and/or, more generally, the example 3D scanning controller 106 of FIG. 1, may be implemented by hardware alone or by hardware in combination with software and/or firmware. Thus, for example, any of the example memory 602, the example light pattern generator circuitry 604, the example random number generator circuitry 606, the example projection controller circuitry 608, the example image sensor controller circuitry 610, the example image analyzer circuitry 612, the example point cloud generator circuitry 614, and/or, more generally, the example 3D scanning controller 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example 3D scanning controller 106 of FIG. 1 may include one or more elements, processes, and/or devices in addition to, or instead of, those illustrated in FIG. 6, and/or may include more than one of any or all of the illustrated elements, processes and devices.

Figure 7:
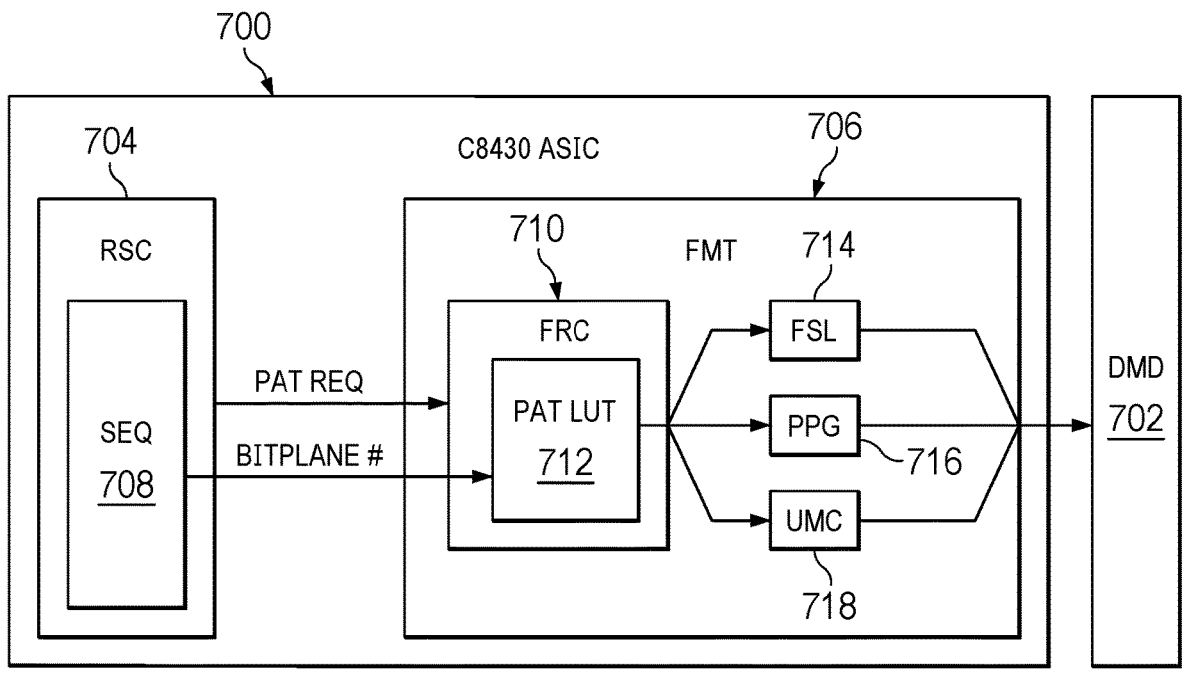
FIGS. 7-9 are functional block diagrams illustrating another example implementation of the example 3D scanning controller of FIG. 1.
Figure 8:
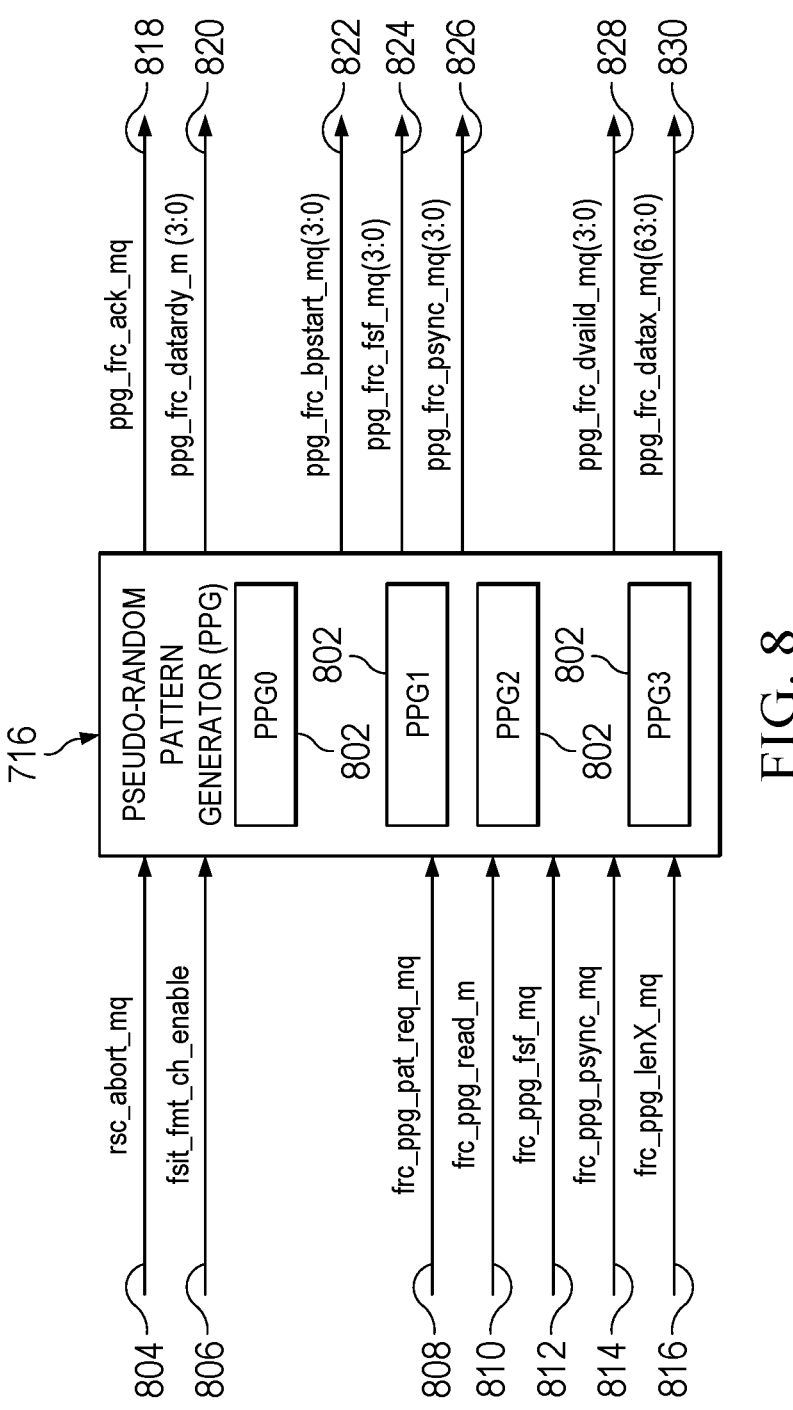
Figure 9:
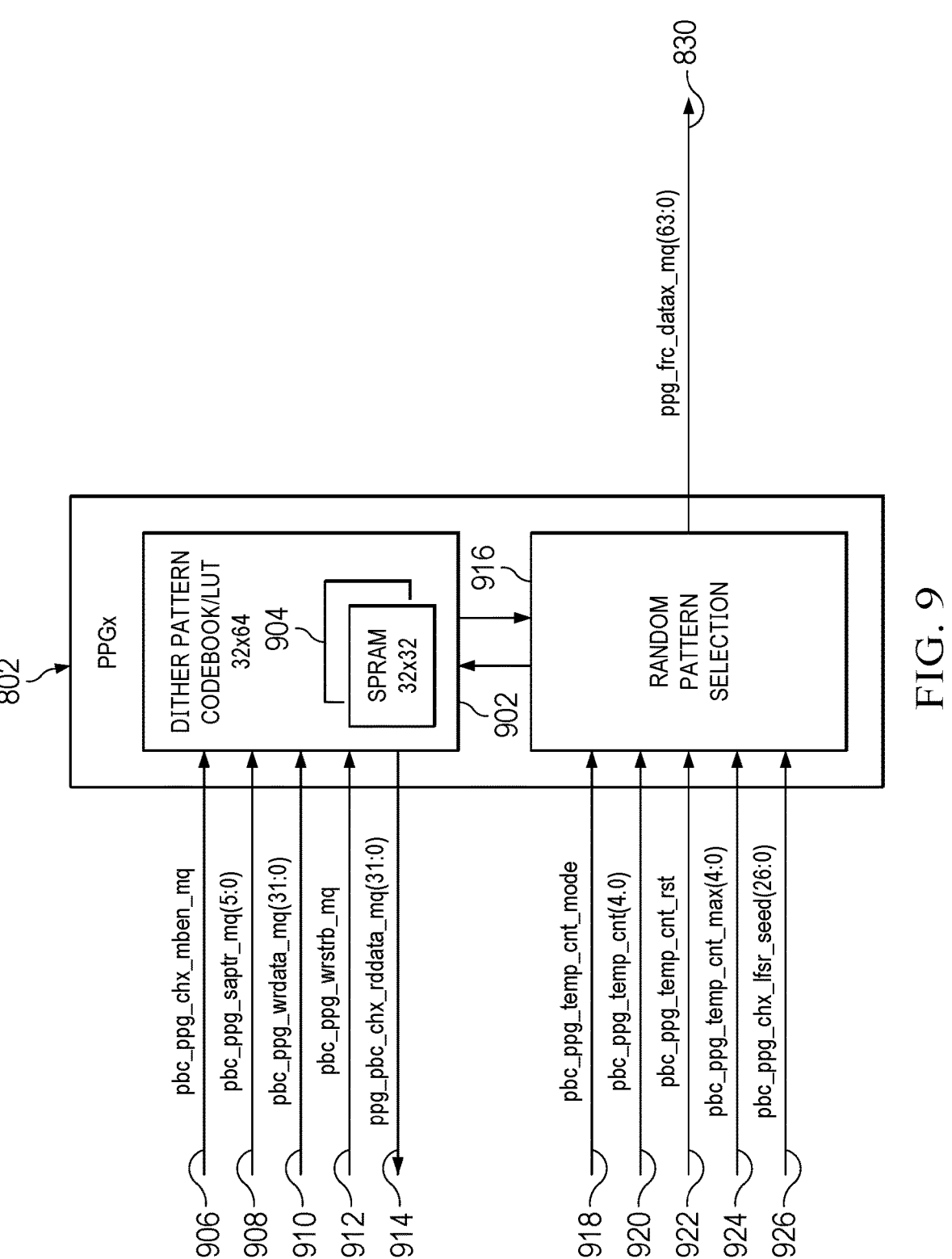

FIGS. 7-9 are functional block diagrams illustrating another example implementation of the example 3D scanning controller of FIG. 1. More particularly, FIG. 7 illustrates an example ASIC 700 used in a projector to control operation of an associated digital micromirror device (DMD) 702. The example ASIC performs, among other things, the functions of at least the light pattern generator circuitry 604, the random number generator circuitry 606, and the projection controller circuitry 608 described above in connection with FIG. 6. FIG. 8 illustrates an implementation of the example pseudo-random pattern generator (PPG) circuitry 716 in the ASIC 700 of FIG. 7. FIG. 9 illustrates an implementation of any one of the example PPG channels 802 implemented by the example PPG of FIG. 8.

As shown in FIG. 7, the example ASIC 700 includes real-time sequence controller (RSC) circuitry 704 and formatter (FMT) circuitry 706. The RSC circuitry 704 controls the timing of the projection system, such as controlling when to display particular bit planes via the DMD 702 and provides the appropriate waveforms to control the DMD 702. In this example, the RSC circuitry 704 includes sequencer circuitry 708 that provides light pattern requests and an identification of the bit planes to the FMT circuitry 706.

In this example, the FMT circuitry 706 includes formatter read controller (FRC) circuitry 710 that uses the patterns requests and bit plane information (received from the sequencer circuitry 708) to determine a source for content to be provided to the DMD 702 for projection. In these examples, the content may be visual content (e.g., RGB bit planes) associated with a video stream or a light pattern (e.g., one of the light patterns 114, 202, 204) projected using infrared light. In the illustrated example, the FRC circuitry 710 includes a pattern lookup table (PAT LUT) 712. The PAT LUT 712 corresponds to the library 308 of FIG. 3 that stores the light pattern tiles 302, 304, 306 that are arranged to define the particular light patterns 114, 202, 204.

The FMT circuitry 706 also includes example formatter structure light generator (FSL) circuitry 714, example pseudo-random pattern generator (PPG) circuitry 716, and example unified memory controller (UMC) circuitry 718. The FSL circuitry 714 serves to format or prepare the content (identified by the FRC circuitry 710) for projection via the DMD 702. The UMC circuitry 718 primarily serves to control the display of visual content (e.g., from a video stream). However, in this examples, the bit planes used to project the visual content are interjected with an infrared bit plane containing a light pattern 114, 202, 204 generated by the PPG circuitry 716.

FIG. 8 provides further detail regarding the implementation of the PPG circuitry 716 of FIG. 7. As shown, the PPG circuitry 716 receives a number of inputs and generates a number of outputs. In some examples, these inputs and outputs are generated via a plurality of different PPG channels 802. In this example, the PPG circuitry 716 includes four channels (e.g., the PPG channels 802) to drive the DMD 702. However, in other examples, a different number of channels may be implemented (e.g., 1, 2, 3, 5, 6, etc.). In the illustrated example of FIG. 8, the first input 804 enables the RSC circuitry 704 to issue an abort signal to reset the system. The second input 806 defines the number of PPG channels 802 to be used. The third input 808 defines a pattern request that initiates or triggers the PPG circuitry 716 to generate a light pattern. The fourth input 810 defines a pattern read request to read the light pattern once it has been generated by the PPG circuitry 716. The fifth and sixth inputs 812, 814 provide time markers for sequencing purposes. The seventh input 816 defines a length of the pattern request (e.g., defines the amount of data to be included for the requested bit plane). The first output 818 is an acknowledgement by the PPG circuitry 716 of the pattern request. The second output 820 indicates the data is ready. The third, fourth, fifth, and sixth outputs 822, 824, 826, 828 provide various data markers to define the start of the bit plane and for purposes of sequencing and validation. The seventh output 830 corresponds to the actual bit plane data.

FIG. 9 provides further detail regarding the implementation of each of the PPG channels 802 shown in FIG. 8. As shown, each PPG channel 802 includes dither pattern lookup table circuitry 902 that implements single port random access memory (SPRAM) 904. In this example, the SPRAM 904 is 32×32 bits. However, in other examples, the SPRAM 904 can be different sizes. The illustrated example of FIG. 9 shows a set of inputs 906, 908, 910, 912 and an output 914 that enable the PPG channel 802 to interface with a processor so that software can control content of the dither pattern look up table.

As shown in FIG. 9, each PPG channel 802 also includes random pattern selection circuitry 916 that interfaces with the dither pattern lookup table circuitry 902 to control the reading of patterns in the lookup table for selection and assignment of the patterns (e.g., the light pattern tiles 302, 304, 306) to different regions 210, 212, 214, 216 in the light pattern 114, 202, 204. In some examples, the selection of a particular light pattern tile 302, 304, 306 is pseudo-randomly controlled based on a temporal count (defined by the first four inputs 918, 920, 922, 924) as well as a starting seed for a linear feedback shift register (LFSR) (defined by the last input 926). More particularly, in some examples, at the beginning of a pseudo-random pattern request, the LFSR should be re-seeded, LFSR (26:0)=PBC_LFSR_SEED (26: 0). In some such examples, with each block of 8×8 pixels, a new 5-bit random value is created from the LFSR, as follows:

rand_value (4:0)=LFSR (0)+(LFSR (9)<<1)+(LFSR (14) <<2)+(LFSR (19)<<3)+(LFSR (23)<<4);

Further, with each block of 8×8 pixels, the LFSR is shifted, by calculating a new start value using exclusive OR operands, as follows:

new_start=(LFSR (0) XOR (LFSR (2) XOR (LFSR (5) XOR LFSR (26))));

The LFSR is right shifted and the new start value is added:

LFSR (26:1)=LFSR (25:0);

LFSR (0)=new_start;

The temporal count is added to the random value for each block of 8×8 pixels as follows:

dither_sel (4:0)=rand_value (4:0)+in_temporal_count (4:0); Finally, with each block of 8×8 pixels, the outgoing bit plane data is found by simply using dither_sel (4:0) as the read address to dither_lut [n] (63:0).

Figure 10:
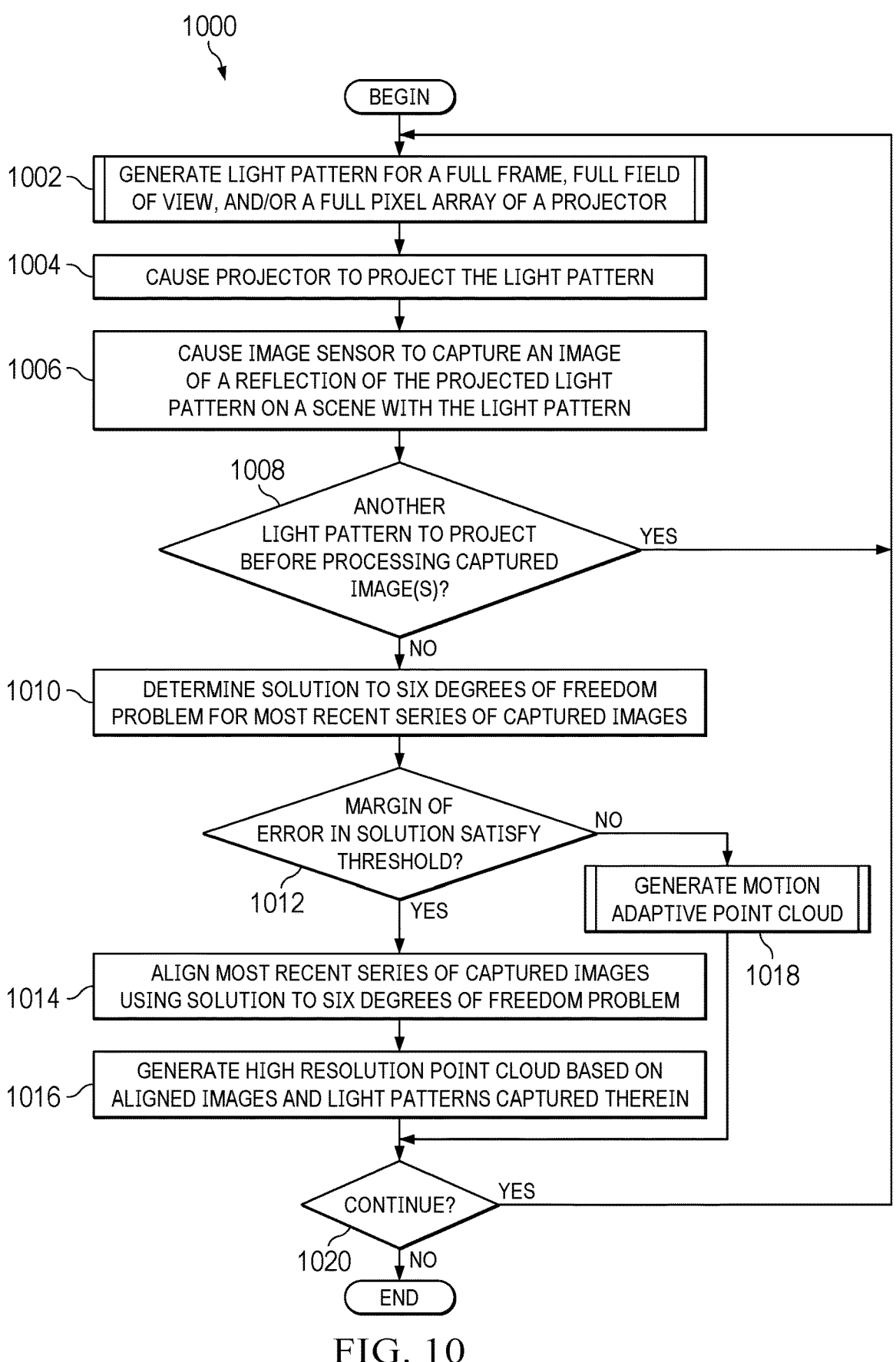
FIGS. 10-12 are flowcharts representative of example machine readable instructions and/or example operations that may be executed by example processor circuitry to implement the example 3D scanning controller of FIG. 6 and/or FIGS. 7-9.
Figure 11:
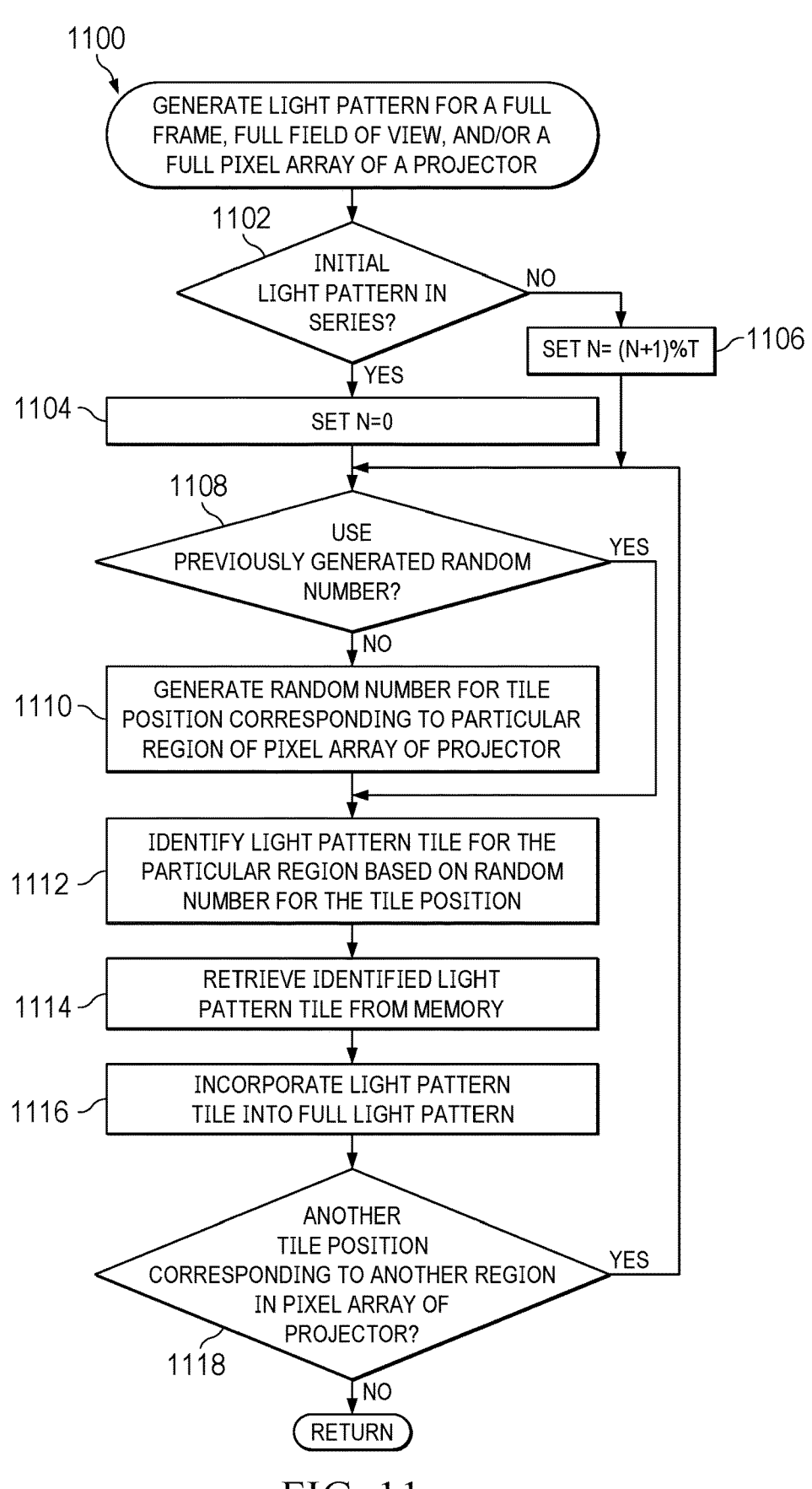
Figure 12:
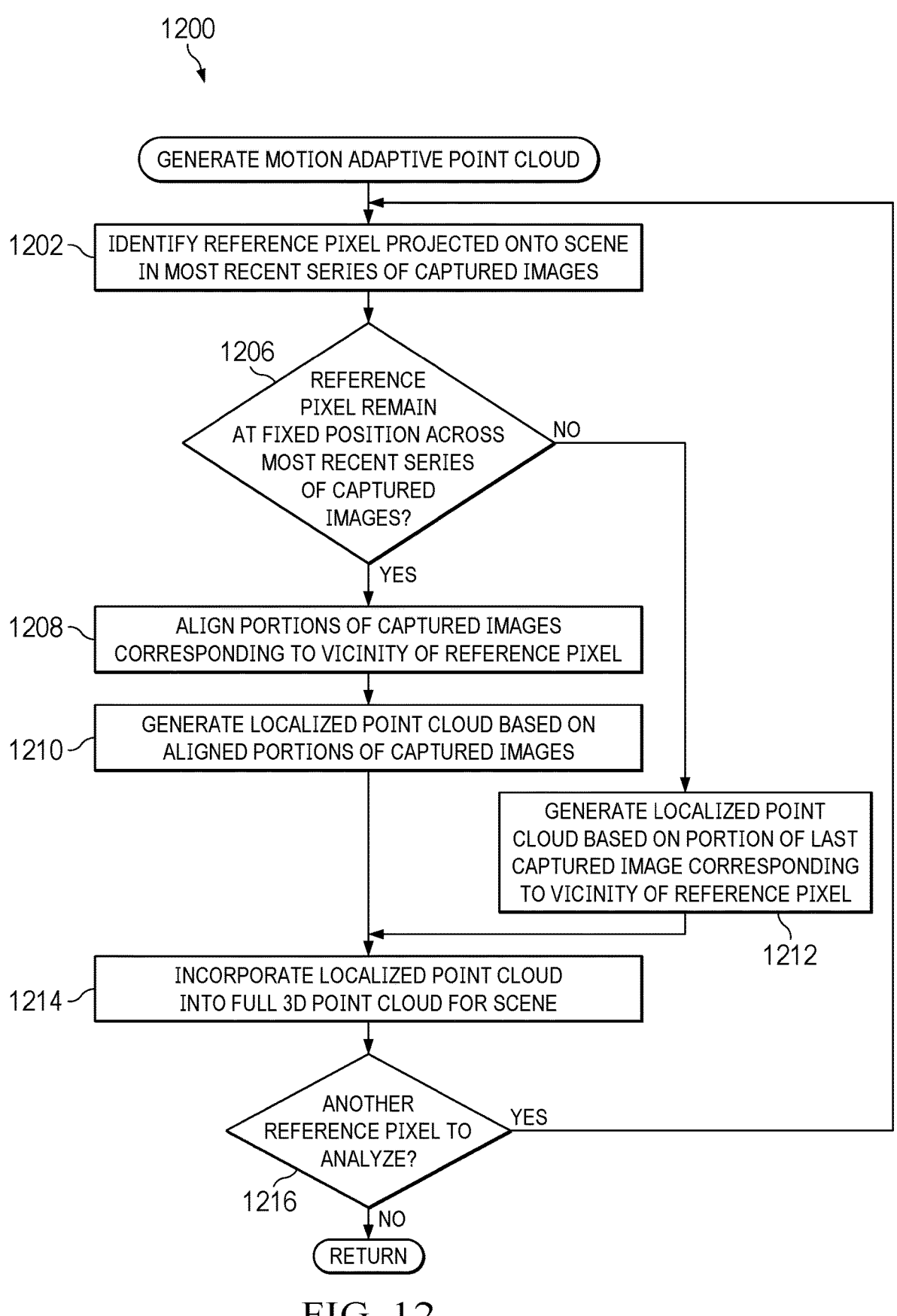

Flowcharts representative of example machine readable instructions, which may be executed to configure processor circuitry to implement the 3D scanning controller 106 of FIG. 6, are shown in FIGS. 10-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10-12, many other methods of implementing the example 3D scanning controller 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 10 is a flowchart representative of example machine readable instructions and/or example operations 1000 that may be executed and/or instantiated by processor circuitry to generate a 3D point cloud of a scene 104. The machine readable instructions and/or the operations 1000 of FIG. 10 begin at block 1002, where the example light pattern generator circuitry 604 generates a light pattern (e.g., the light patterns 114, 202, 204) for a full frame, full field of view, and/or full pixel array 115 of a projector 108. Further detail regarding the implementation of block 1002 is provided below in connection with FIG. 11. At block 1004, the example projection controller circuitry 608 causes the projector 108 to project the light pattern 114, 202, 204. At block 1006, the example image sensor controller circuitry 610 causes the image sensor 110 to capture an image of a reflection of the projected light pattern 114, 202, 204 on a scene 104 with the light pattern 114, 202, 204.

At block 1008, the example light pattern generator circuitry 604 determines whether another light pattern is to be projected before processing the captured image(s). If so, control returns to block 1002. Otherwise, control advances to block 1010. In some examples, processing of the images (e.g., advancing to block 1010) does not occur until the number of light patterns projected and images captured is equal to the temporal depth. That is, not until there are a sufficient number of captured images with corresponding light patterns to include projected pixels from every pixel in the pixel array 115 of the projector 108. Thus, based on the light patterns 114, 202, 204 shown and described above in connection with FIGS. 1-5, the process of FIG. 10 would not advance beyond block 1008 until all three light patterns 114, 202, 204 have been projected onto the scene and captured in a corresponding image. In some examples, after causing projection of all three light patterns 114, 202, 204 and after proceeding through the rest of the flowchart of FIG. 10, the entire process may start over by generating a new initial light pattern followed by two others that are completely independent of the initial series of three light patterns 114, 202, 204. However, in other examples, after causing projection of all three light patterns 114, 202, 204 and after proceeding through the rest of the flowchart of FIG. 10, a fourth light pattern may be generated that corresponds to the first light pattern 114. That is, in some examples, the series of light patterns 114, 202, 204 may be iterated through multiple times. In such examples, when control advances to block 1008 after projecting the fourth light pattern (corresponding to the second instance of the first light pattern 114), control continues directly onto block 1010 without needing to generate and project second instances of the second and third light patterns 202, 204 before processing the captured images. Rather, in such examples, the most recent series of captured images are processed. That is, in the first iteration past block 1008, the first three captured images are processed. In the second iteration past block 1008, the second, third and fourth images are processed (without regard to the first captured image). In each subsequent iteration through the flowchart, the images processed are incremented or shifted by one to always correspond to the most recent series of images. As discussed above, the use of three light patterns in the series is for purposes of illustration only and any other suitable number (e.g., 4, 5, 6, 10, 12, 15, 16, 32, 64, etc.) of light patterns may be generated in series before the process repeats.

At block 1010, the example image analyzer circuitry 612 determines a solution to the six degrees of freedom problem for the most recent series of captured images. In some examples, as disclosed above, this accomplished by analyzing the reference pixels 120 in each of the different images captured in the series under analysis. At block 1012, the example image analyzer circuitry 612 determines whether the margin of error in the solution satisfies (e.g., is less than or equal to) a threshold. If so, control advances to block 1014 where the example image analyzer circuitry 612 aligns the most recent series of captured images using the solution to the six degrees of freedom problem. Thereafter, at block 1016, the example point cloud generator circuitry 614 generates a high resolution point cloud based on the aligned images and the associated light patterns captured therein. Thereafter, control advances to block 1020, where the example 3D scanning controller 106 determines whether to continue the process (e.g., initiate another scan of the scene 104). If so, control returns to block 1002 to repeat the process.

Returning to block 1012, if the margin of error does not satisfy the threshold, control advances to block 1018 where the example point cloud generator circuitry 614 generates a motion adaptive point cloud. Further detail regarding the implementation of block 1018 is provided below in connection with FIG. 12. Thereafter, control advances to block 1020 to determine whether to continue the process. If not, the example process of FIG. 10 ends.

FIG. 11 is a flowchart representative of example machine readable instructions and/or example operations 1100 that may be executed and/or instantiated by processor circuitry to implement block 1002 of FIG. 10. The machine readable instructions and/or the operations 1100 of FIG. 11 begin at block 1102, where the example light pattern generator circuitry 604 determines whether the light pattern to be generated is an initial light pattern in a series of light pattern to be projected onto the scene. If so, control advances to block 1104 where the temporal counter is set to n=0. By contrast, if the light pattern to be generated is not the initial light pattern in the series, control advances to block 1106 where the temporal counter is set to n=(n+1) % T. The modulus operator (%) ensures that the temporal counter (n) returns to 0 after cycling through the temporal depth (T). In other examples, the temporal counter is simply incremented after each iteration and reset to 0 in response to the determination (at block 1102) that a new series of light patterns is to begin.

Once the temporal counter is set (at either block 1104 or block 1106), control advances to block 1108 where the example light pattern generator circuitry 604 determines whether to use previously generated random numbers. In some examples, previously generated random numbers are used if the light pattern to be generated is not the initial light pattern in the series (as determined at block 1102). If previously generated random numbers are not to be used, control advances to block 1110 where the example random number generator circuitry 606 generates a random number for a given tile position corresponding to a particular region (e.g., the regions 210, 212, 214, 216) of the pixel array 115 of the projector 108. Thereafter, control advances to block 1112. Returning to block 1108, if previously generated random numbers are to be used, control advances directly to block 1112.

At block 1112, the example light pattern generator circuitry 604 identifies a particular light pattern tile (e.g., the tiles 302, 304, 306) for the particular region 210, 212, 214, 216 based on the random number for the tile position. At block 1114, the example light pattern generator circuitry 604 retrieves the identified tiles 302, 304, 306 from the example memory 602 (e.g., from the library 308 of tiles). At block 1116, the example light pattern generator circuitry 604 incorporates the tiles 302, 304, 306 into a full light pattern. At block 1118, the example light pattern generator circuitry 604 determines whether there is another tile position corresponding to another region 210, 212, 214, 216 in the pixel array 115 of the projector 108. If so, control returns to block 1108. Otherwise, the example process of FIG. 11 ends and returns to complete the process of FIG. 10.

FIG. 12 is a flowchart representative of example machine readable instructions and/or example operations 1200 that may be executed and/or instantiated by processor circuitry to implement block 1018 of FIG. 10. The machine readable instructions and/or the operations 1200 of FIG. 12 begin at block 1202, where the example point cloud generator circuitry 614 (and/or the image analyzer circuitry 612) identifies a reference pixel 120 projected on the scene 104 in the most recent series of captured images. At block 1206, the example point cloud generator circuitry 614 (and/or the image analyzer circuitry 612) determines whether the reference pixel 120 remains at a fixed position across the most recent series of captured images. If so, control advances to block 1208. Otherwise, control advances to block 1212.

At block 1208, the example image analyzer circuitry 612 aligns portions of the captured images corresponding to the vicinity of the reference pixel. In some examples, the portions of the captured images to be aligned correspond to the different regions 210, 212, 214, 216 in the light patterns 114, 202, 204 associated with the different tiles 302, 304, 306. However, in other examples, the portions of the images may correspond to different regions smaller, larger, and/or a different shape than the regions 210, 212, 214, 216 associated with the different tiles 302, 304, 306. In some examples, control advances to block 1208 from block 1206 when the reference pixel 120 remains fixed across only some (less than all) of the captured images. In such examples, only portions from the images in which the reference pixel 120 is fixed are aligned at block 1208.

At block 1210, the example point cloud generator circuitry 614 generates a localized point cloud based on the aligned portions of the captured images. Inasmuch as the localized point cloud is based on the alignment of the series of captured images, the localized point cloud generated at block 1210 will have a relatively high resolution (e.g., comparable to the resolution of the projector 108). At block 1212, the example point cloud generator circuitry 614 generates a localized point cloud based on a portion of the last captured image corresponding to the vicinity of the reference pixel. Inasmuch as the localized point cloud is based on the portion of only one image, the localized point cloud generated at block 1212 will have a relatively low resolution (e.g., corresponding to the sparse distribution of the illuminated pixels in the associated light pattern 114, 202, 204).

After generating the localized point cloud (either at block 1210 or block 1212) control advances to block 1214 where the example point cloud generator circuitry 614 incorporates the localized point cloud into a full 3D point cloud for the scene 104. Thereafter, control advances to block 1216 where the example point cloud generator circuitry 614 (and/or the image analyzer circuitry 612) determines whether there is another reference pixel 120 to analyze. If so, control returns to block 1202. Otherwise, the example process of FIG. 12 ends and returns to complete the process of FIG. 10.

Figure 13:
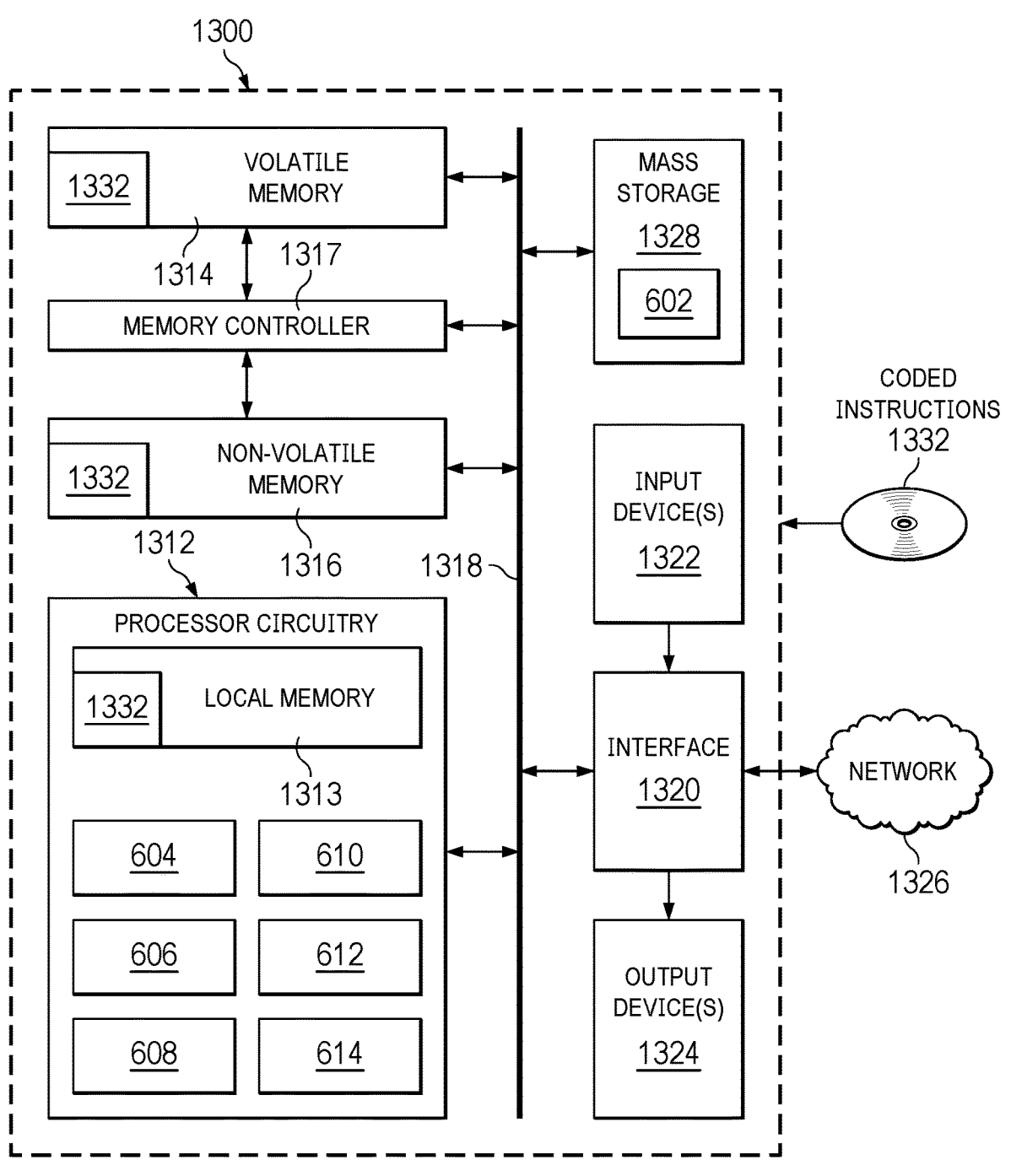
FIG. 13 is a block diagram of an example processing platform including processor circuitry structured to execute the example machine readable instructions and/or the example operations of FIGS. 10-12 to implement the example 3D scanning controller of FIG. 6 and/or FIGS. 7-9.

FIG. 13 is a block diagram of an example processor platform 1300 structured to execute and/or instantiate the machine readable instructions and/or the operations of FIGS. 10-12 to implement the 3D scanning controller 106 of FIG. 6. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example light pattern generator circuitry 604, the example random number generator circuitry 606, the example projection controller circuitry 608, the example image sensor controller circuitry 610, the example image analyzer circuitry 612, and the example point cloud generator circuitry 614.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage devices 1328 includes the memory 602.

The machine readable instructions 1332, which may be implemented by the machine readable instructions of FIGS. 10-12, may be stored in the mass storage device 1328, in the volatile memory 1314, in the non-volatile memory 1316, and/or on a removable non-transitory computer readable storage medium such as a CD or DVD.

Figure 14:
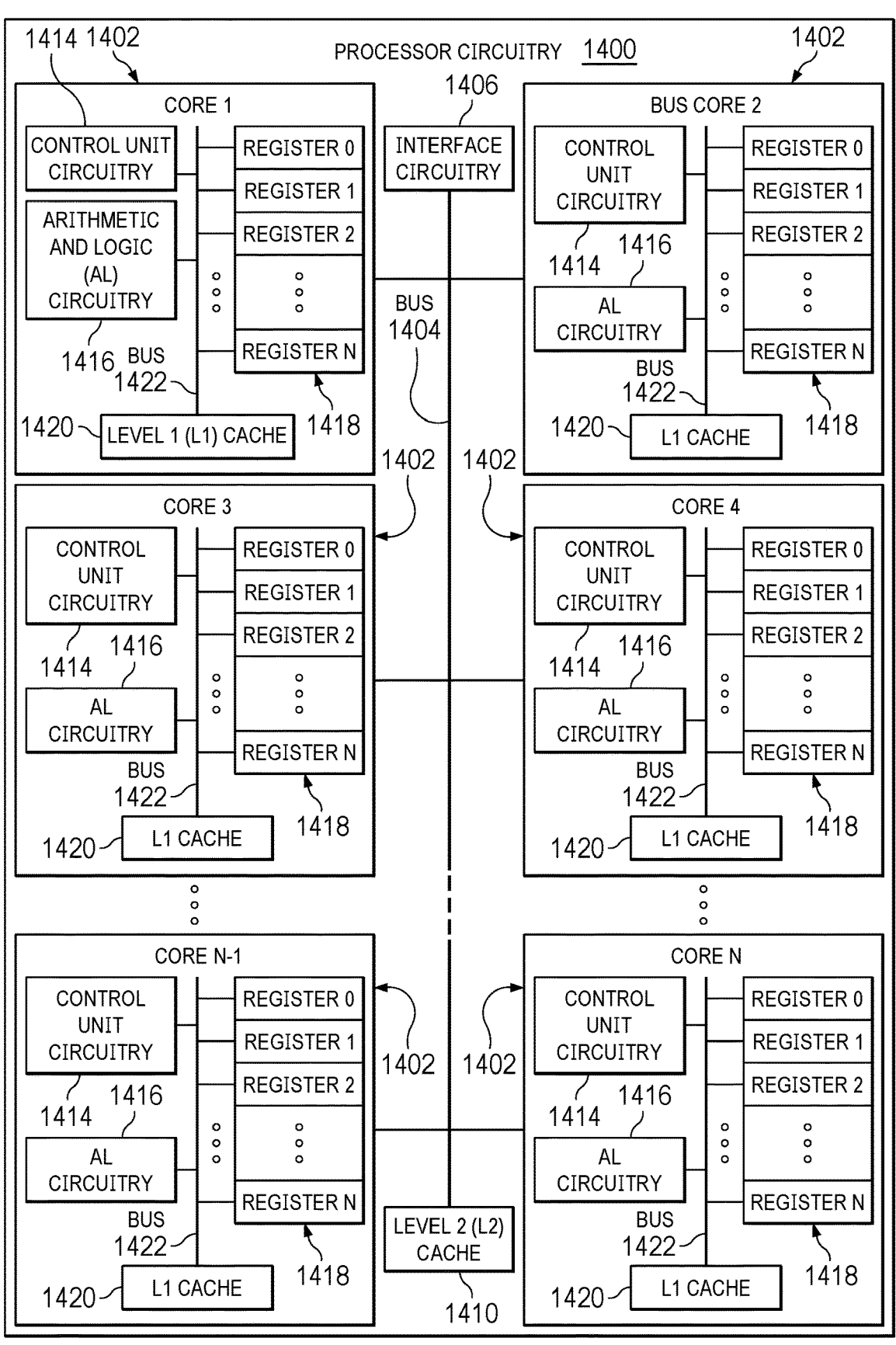
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 10-12 to effectively instantiate the circuitry of FIG. 6 as logic circuits to perform the operations corresponding to those machine readable instructions. In some such examples, the circuitry of FIG. 6 is instantiated by the hardware circuits of the microprocessor 1400 in combination with the instructions. For example, the microprocessor 1400 may be implemented by multi-core hardware circuitry such as a CPU, a DSP, a GPU, an XPU, etc.

Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 10-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an arithmetic and logic unit (ALU)) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register (s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
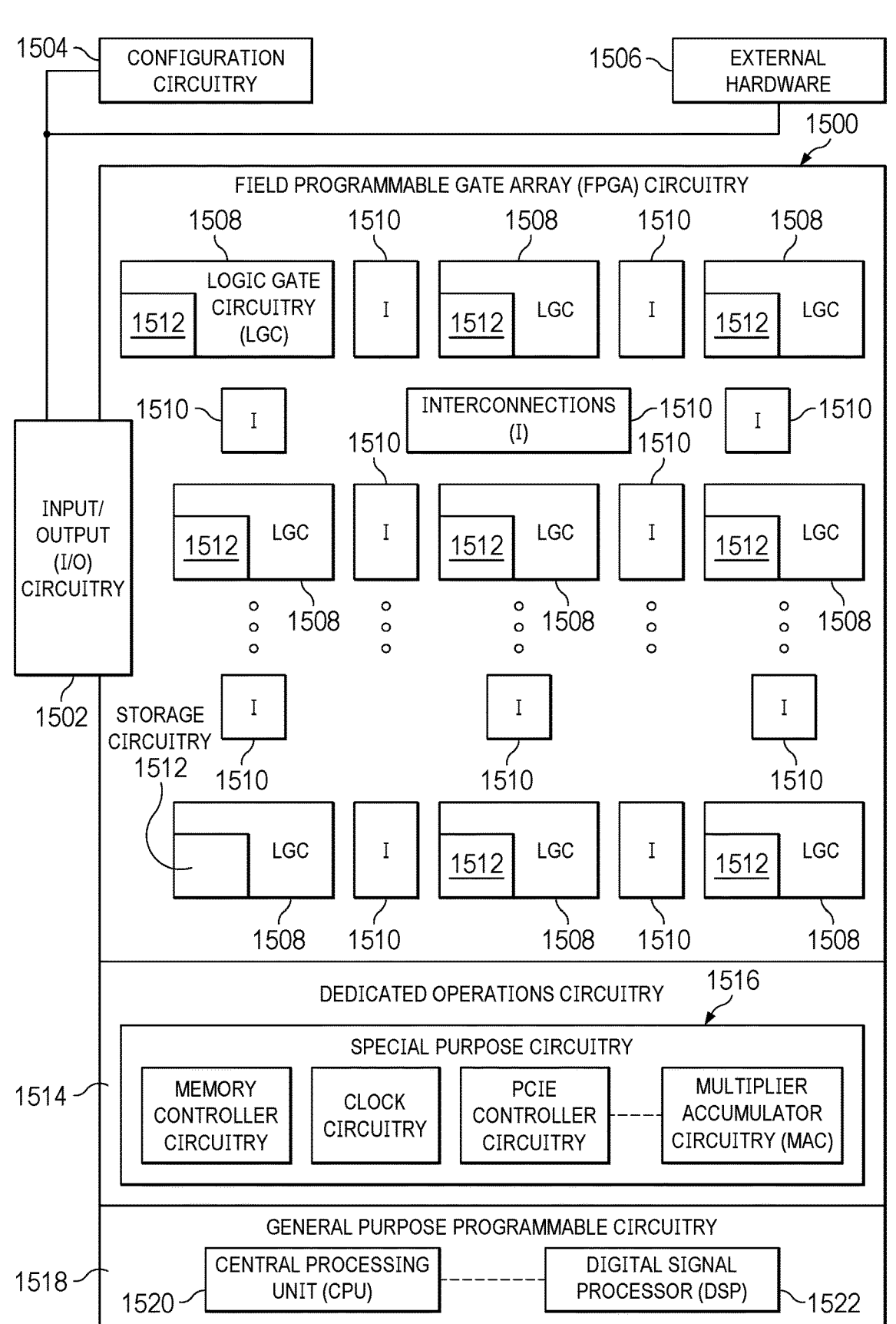
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 10-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 10-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 10-12. As such, the FPGA circuitry 1500 may be structured to effectively instantiate some or all of the machine readable instructions of the flowcharts of FIGS. 10-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 10-12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 10-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an onboard CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 10-12 may be executed by one or more of the cores 1402 of FIG. 14, a second portion of the machine readable instructions represented by the flowcharts of FIGS. 10-12 may be executed by the FPGA circuitry 1500 of FIG. 15, and/or a third portion of the machine readable instructions represented by the flowcharts of FIGS. 10-12 may be executed by an ASIC. It should be understood that some or all of the circuitry of FIG. 6 may, thus, be instantiated at the same or different times. Some or all of the circuitry may be instantiated, for example, in one or more threads executing concurrently and/or in series. Moreover, in some examples, some or all of the circuitry of FIG. 6 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
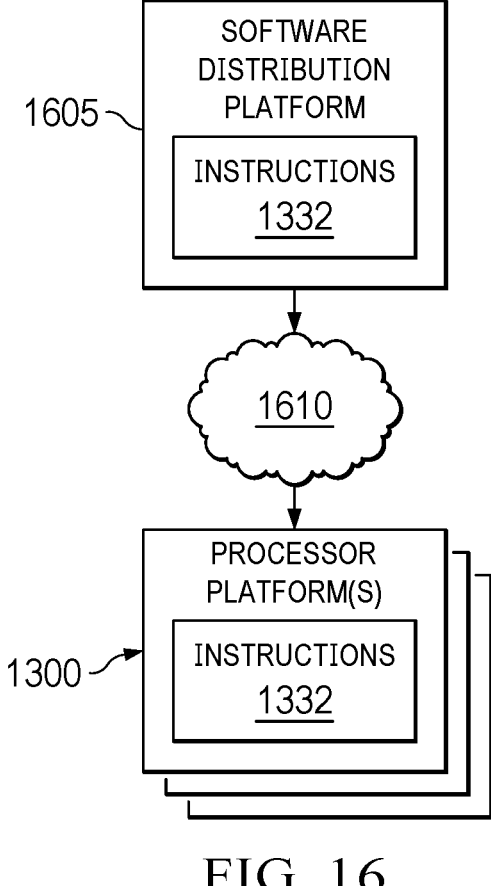
FIG. 16 is a block diagram of an example software distribution platform (e.g., one or more servers) to distribute software (e.g., software corresponding to the example machine readable instructions of FIGS. 10-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the operations 1000, 1100, 1200 of FIGS. 10-12, as described above. The one or more servers of the example software distribution platform 1605 are in communication with an example network 1610, which may correspond to any one or more of the Internet and/or any of the example networks 1326 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the operations 1000, 1100, 1200 of FIGS. 10-12, may be downloaded to the example processor platform 1300, which is to execute the machine readable instructions 1332 to implement the 3D scanning controller 106. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that generate spatiotemporal light patterns in a memory efficient manner used to generate a 3D point cloud of a scene that can adapt to different amounts of motion in the scene to increase the resolution of the 3D point cloud. More particularly, a series of different light patterns are generated and projected in succession onto the scene to be captured by an image sensor. The light patterns include reference pixels at fixed positions across the different light patterns to enable different ones of the captures images to be compared to solve the six degrees of freedom problem. If a reliable solution to the problem can be calculated, the scene is assumed to be stationary and the different images in the series are combined to generate a 3D point cloud with a resolution corresponding to the aggregate of the illuminated pixels of each light pattern in the series. In some examples, the aggregation of the illuminated pixels across the different light patterns in the series corresponds to all pixels in the pixel array of the projector projecting the light patterns. As a result, the resolution of the resulting 3D point cloud is relatively high and corresponds to the resolution of the projector. If the margin of error in the solution to the six degrees of freedom problem exceeds a threshold (or no solution can be calculated), the scene is assumed to include motion, in which case individual regions are analyzed to determine whether they are stationary or associated with motion. Depending on the determination of the analysis for each region, either a high resolution localized point cloud is generated (based on all images in the series) or a low resolution localized point cloud is generated (based on less than all images in the series). The localized point clouds can be combined into a final full 3D point cloud for the scene that has higher resolution than would be possible by strictly limiting the analysis to less than all of the images captured in the series. The light patterns used in the above process are generated using a library of relatively small light patterns tiles that are randomly designated to different regions of a complete pixel array of the projector. The small size of the light pattern tiles (relative to a full light pattern) and the ability to reuse the same light pattern tiles multiple times within a single light pattern and across different light patterns significantly reduces the memory requirements of the system relative storing multiple full light patterns (or even one full light pattern). Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes a controller comprising memory, instructions, processor circuitry to execute the instructions to generate a series of light patterns based on a set of light pattern tiles, each of the light pattern tiles defined by a different arrangement of illuminated pixels, each of the light patterns defined by a different arrangement of the light pattern tiles, instruct a projector to project the series of light patterns, instruct an image sensor to capture a series of images of reflections of the series of light patterns, and generate a three-dimensional point cloud based on the series of captured images.

Example 2 includes the controller of example 1, wherein the light patterns comprise arrays of distinct regions, the processor circuitry configured to generate a first light pattern in the series of the light patterns based on an assignment of the light pattern tiles to corresponding regions in the arrays of distinct regions.

Example 3 includes the controller of example 2, wherein at least one of the light pattern tiles is used more than once in the first light pattern.

Example 4 includes the controller of example 2, wherein the assignment of a first light pattern tile of the light pattern tiles to a first region of the regions is performed based on a random number.

Example 5 includes the controller of example 2, wherein the processor circuitry is configured to generate a second light pattern in the series of light patterns based on the first light pattern, assignment of the light pattern tiles to corresponding ones of the regions in the second light pattern are assigned to be different than the light pattern tiles in the same corresponding ones of the regions in the first light pattern.

Example 6 includes the controller of example 1, wherein the light patterns include reference pixels, different ones of the reference pixels corresponding to a particular one of the illuminated pixels in each of the light pattern tiles, the reference pixels being at common positions across different ones of the light patterns in the series of light patterns, the processor circuitry configured to determine whether locations of the reflections of the projected reference pixels in the images of the series of images are different.

Example 7 includes the controller of example 6, wherein, responsive to determining that the locations of the reflections of the projected reference pixels in the images of the series of images is not different, the processor circuitry is configured to generate the three-dimensional point cloud based on a combination of multiple ones of the light patterns in the series of light patterns captured in multiple ones of the series of images.

Example 8 includes the controller of example 6, wherein responsive to determining that locations of the reflections of the projected reference pixels in the images of the series of images are different, the processor circuitry is configured to identify first regions in the images associated with areas of the series of images near reference pixels in which reflections of the projected reference pixels in the images of the series of images are not different, generate first localized point clouds for the first regions based on multiple of the captured images in the series of images, and generate second localized point clouds for second regions based on one of the captured images in the series of images, and generate the three-dimensional point cloud based on the first and second localized point clouds.

Example 9 includes the controller of example 8, wherein different ones of the first and second regions correspond to areas of a scene surrounding different ones of the reference pixels projected onto the scene.

Example 10 includes the controller of example 1, wherein the light patterns include infrared light, and the processor circuitry is further configured to instruct the projector to project successive frames of visual content, the visual content including visible light, the projection of successive ones of the light patterns in the series of light patterns temporally separated by the projection of ones of the successive frames of visual content.

Example 11 includes a system comprising memory, a controller coupled to the memory, the controller configured to access a set of light pattern tiles from memory, each of the light pattern tiles associated with an array of pixels of a same size, each of the light pattern tiles defining a different arrangement of illuminated pixels distributed among non-illuminated pixels, generate a first light pattern based on an assignment of ones of the light pattern tiles to ones of multiple regions of the first light pattern, a number of the light pattern tiles being less than a number of the regions of the first light pattern, a projector coupled to the controller, the projector configured to project the first light pattern onto a scene, and an image sensor coupled to the controller, the image sensor configured to capture an image of a reflection of the first light pattern, the controller configured to generate a three-dimensional point cloud of the scene based on the image.

Example 12 includes the system of example 11, wherein the image is a first image and the controller is configured to generate a second light pattern based on an assignment of ones of the light pattern tiles to ones of multiple regions of the second light pattern, the regions of the second light pattern corresponding to the regions of the first light pattern, each region of the second light pattern to be assigned a different one of the light pattern tiles than the assignment of the light pattern tiles to the corresponding region of the first light pattern, and generate the three-dimensional point cloud of the scene based on a second image of a second reflection of the second light pattern is projected onto the scene, the projector configured to project the second light pattern onto the scene after the projection of the first light pattern and the image sensor configured to capture an image of a reflection of the second light pattern.

Example 13 includes the system of example 12, wherein one of the illuminated pixels in each of the light pattern tiles is a reference pixel that is at a same position within each of the light pattern tiles such that the first and second light patterns include multiple reference pixels at common positions within the first and second light patterns.

Example 14 includes the system of example 13, wherein the controller is configured to determine whether locations of the reflections of the projected reference pixels in the first and second images is different.

Example 15 includes the system of example 14, wherein the controller is configured to generate the three-dimensional point cloud based on a combination of multiple localized point clouds responsive to determining that the reflections of at least one of the projected reference pixels in the first and second images is different.

Example 16 includes the system of example 15, wherein first ones of the localized point clouds are generated for first areas of the first and second images near reference pixels in which reflections of the projected reference pixels in the first and second images are not different, and second ones of the localized point clouds are generated for second areas of the first and second images near reference pixels in which reflections of the projected reference pixels in the first and second images are different, the first localized point clouds having a higher resolution than the second localized point clouds.

Example 17 includes a method comprising identifying a reflection of a reference pixel captured in a series of images of a scene, the reference pixel included in each of a series of light patterns projected onto the scene when the series of images are captured, determining, by executing instructions with processor circuitry, whether the reflection of the reference pixel remains at a first position across the series of images, and generating, by executing instructions with the processor circuitry, a three-dimensional point cloud of the scene based on the images, a resolution of the three-dimensional point cloud based on the determination.

Example 18 includes the method of example 17, further comprising, in response to determining the reflection remains at the first position across the series of images aligning portions of the series of images corresponding to a vicinity of the reflection of the reference pixel, and generating a localized point cloud based on the aligned portions of the series of images.

Example 19 includes the method of example 18, further comprising, in response to determining the reflection does not remain at the first position across the series of images, generating a localized point cloud based on a portion of a single one of images in the series.

Example 20 includes the method of example 18, wherein the generating of the three-dimensional point cloud is based on the localized point cloud.

Example 21 includes a non-transitory machine readable storage medium comprising instructions that, when executed, cause processor circuitry to at least access a set of light pattern tiles from memory, each of the light pattern tiles associated with an array of pixels of a same size, each of the light pattern tiles defining a different arrangement of illuminated pixels distributed among non-illuminated pixels, generate a first light pattern based on an assignment of ones of the light pattern tiles to ones of multiple regions of the first light pattern, a number of the light pattern tiles being less than a number of the regions of the first light pattern, cause projection of the first light pattern onto a scene, and generate a three-dimensional point cloud of the scene based on an image of the scene captured when the first light pattern is projected onto the scene.

Example 22 includes the non-transitory machine readable storage medium of example 21, wherein the image is a first image, and the instructions cause the processor circuitry to generate a second light pattern based on an assignment of ones of the light pattern tiles to ones of multiple regions of the second light pattern, the regions of the second light pattern corresponding to the regions of the first light pattern, each region of the second light pattern to be assigned a different one of the light pattern tiles than the assignment of the light pattern tiles to the corresponding region of the first light pattern, cause projection of the second light pattern onto the scene after the projection of the first light pattern, and generate the three-dimensional point cloud of the scene based on a second image of the scene captured when the second light pattern is projected onto the scene.

Example 23 includes the non-transitory machine readable storage medium of example 22, wherein one of the illuminated pixels in each of the light pattern tiles is a reference pixel that is at a same position within each of the light pattern tiles such that the first and second light patterns include multiple reference pixels at common positions within the first and second light patterns.

Example 24 includes the non-transitory machine readable storage medium of example 23, wherein the instructions cause the processor circuitry to determine whether the scene is moving, relative to a projector that projects the first and second light patterns, based on a change in location of the projection of the reference pixels captured in the first and second images.

Example 25 includes the non-transitory machine readable storage medium of example 24, wherein the instructions cause the processor circuitry to generate the three-dimensional point cloud based on a combination of multiple localized point clouds when the scene is determined to be moving relative to the projector.

Example 26 includes the non-transitory machine readable storage medium of example 25, wherein first ones of the localized point clouds are generated for stationary areas of the scene and second ones of the localized point clouds are generated for non-stationary areas of the scene, the first localized point clouds having a higher resolution than the second localized point clouds.

Example 27 includes a method comprising generating, by executing instructions with processor circuitry, a first light pattern in a series of light patterns based on a first assignment of ones of a library of light pattern tiles to ones of multiple tile positions within the first light pattern, each of the light pattern tiles defining a different arrangement of illuminated pixels, each of the light pattern tiles being smaller than the first light pattern, projecting the first light pattern onto a scene, and generating a three-dimensional point cloud of the scene based on an image of the scene captured when the first light pattern is projected onto the scene.

Example 28 includes the method of example 27, wherein the image is a first image, and the instructions cause the processor circuitry to generating a second light pattern based on a second assignment of ones of the light pattern tiles to multiple tile positions of the second light pattern, the second assignment of light pattern tiles to be different than but based on the first assignment of the light pattern tiles, projecting the second light pattern onto the scene after the projection of the first light pattern, and generating the three-dimensional point cloud of the scene based on a second image of the scene captured when the second light pattern is projected onto the scene.

Example 29 includes the method of example 28, wherein one of the illuminated pixels in each of the light pattern tiles is a reference pixel that is at a same position within each of the light pattern tiles such that the first and second light patterns include multiple reference pixels at common positions within the first and second light patterns.

Example 30 includes the method of example 28, further including determining whether the scene includes an area that is non-stationary, relative to an image sensor that captured the first and second images, based on an analysis of the first and second images, and adapting the generation of the three-dimensional point cloud based on the determination.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A controller comprising:
memory configurable to store instructions; and
processor circuitry coupled to the memory, the processor circuitry configurable to execute the instructions to:
    determine a series of light patterns, each light pattern of the series of light patterns determined based on a different spatial arrangement of light pattern tiles, each comprised of an array of pixels, wherein among any two light pattern tiles, there are a greater number of correspondingly located pixels having different values than correspondingly located pixels having the same value;
    instruct a spatial light modulator to project the series of light patterns;
    instruct an image sensor to capture a series of images of reflections of the series of light patterns; and
    determine a three-dimensional point cloud responsive to the series of captured images.

2. The controller of claim 1, wherein each light pattern of the series of light patterns includes distinct regions, the processor circuitry further configured to generate a first light pattern in the series of the light patterns responsive to an assignment of the light pattern tiles to corresponding regions in the arrays of distinct regions.

3. The controller of claim 2, wherein at least one of the light pattern tiles is used more than once in the first light pattern.

4. The controller of claim 2, wherein the assignment of a first light pattern tile of the light pattern tiles to a first region of the regions is performed responsive to a random number.

5. The controller of claim 2, wherein the processor circuitry is further configured to generate a second light pattern in the series of light patterns responsive to the first light pattern, in which assignment of the light pattern tiles to corresponding ones of the regions in the second light pattern are different than the assignment of light pattern tiles in the same corresponding ones of the regions in the first light pattern.

6. The controller of claim 1, wherein first subsets of pixels of two of the light pattern tiles have correspondingly located pixels having different values and second subsets of pixels of the two light pattern tiles have correspondingly located pixels having different values, the processor circuitry further configured to determine whether locations of the reflections of the second subsets of pixels in the images of the series of images are different.

7. The controller of claim 6, wherein, responsive to determining that the locations of the reflections of the second subsets of pixels in the images of the series of images are not different, the processor circuitry is configured to generate the three-dimensional point cloud responsive to a combination of multiple ones of the light patterns in the series of light patterns captured in multiple ones of the series of images.

8. The controller of claim 6, wherein responsive to determining that locations of the reflections of the second subsets of pixels in the images of the series of images are different, the processor circuitry is configured to:
    identify first regions in the images associated with areas of the series of images near reference pixels in which reflections of the second subsets of pixels in the images of the series of images are not different;
    generate first localized point clouds for the first regions responsive to multiple of the captured images in the series of images; and
    generate second localized point clouds for second regions responsive to one of the captured images in the series of images; and
    generate the three-dimensional point cloud responsive to the first and second localized point clouds.

9. The controller of claim 8, wherein different ones of the first and second regions correspond to areas of a scene surrounding different ones of the second subset of pixels projected onto the scene.

10. The controller of claim 1, wherein the light patterns include infrared light, and the processor circuitry is further configured to instruct the spatial light modulator to project successive frames of visual content, the visual content including visible light, the projection of successive ones of the light patterns in the series of light patterns temporally separated by the projection of ones of the successive frames of visual content.

11. A controller comprising:
memory configurable to store instructions; and
processor circuitry coupled to the memory, the processor circuitry configurable to execute the instructions to:
    instruct a projector to project frames of visible content, the visible content including visible light;
    determine a series of infrared light patterns;
    instruct the projector to project the series of infrared light patterns, in which the projection of successive ones of the infrared light patterns in the series of infrared light patterns is temporally separated by the projection of ones of the successive frames of visual content;
    instruct an image sensor to capture a series of images of reflections of the series of light infrared patterns; and
    determine a three-dimensional point cloud responsive to the series of images.

12. The controller of claim 11, wherein instructing the projector to project the frames of visible image content is performed during a first time period, instructing the projector to project the series of infrared light patterns is performed during a second time period, the second time period different than the first time period.

13. The controller of claim 11, wherein instructing the projector to project the series of infrared light patterns comprises transmitting a series of bitplanes.

14. The controller of claim 11, wherein each image of the series of images is comprised of tile light patterns, in which each image has a different spatial arrangement of tile light patterns.

15. The controller of claim 11, wherein the processor circuitry is further configured to determine whether an image portion includes the series of images or one image of the series of images responsive to the series of images, and wherein determining the three-dimensional point cloud is performed responsive to the image portion.

* * * * *